United States Patent
Abe et al.

(10) Patent No.: US 9,318,776 B2
(45) Date of Patent: Apr. 19, 2016

(54) NONAQUEOUS ELECTROLYTE SOLUTION AND ELECTRICITY STORAGE DEVICE USING SAME

(71) Applicant: UBE INDUSTRIES, LTD., Ube-shi (JP)

(72) Inventors: Koji Abe, Ube (JP); Masahide Kondo, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 0 days.

(21) Appl. No.: 14/422,563

(22) PCT Filed: Aug. 21, 2013

(86) PCT No.: PCT/JP2013/072336
§ 371 (c)(1),
(2) Date: Feb. 19, 2015

(87) PCT Pub. No.: WO2014/030684
PCT Pub. Date: Feb. 27, 2014

(65) Prior Publication Data
US 2015/0333370 A1    Nov. 19, 2015

(30) Foreign Application Priority Data

Aug. 24, 2012  (JP) .................................. 2012-185084
Oct. 15, 2012  (JP) .................................. 2012-227669
Mar. 11, 2013  (JP) .................................. 2013-047608
Jun. 21, 2013  (JP) .................................. 2013-130417

(51) Int. Cl.

| | |
|---|---|
| H01M 6/16 | (2006.01) |
| H01M 10/0567 | (2010.01) |
| H01M 4/131 | (2010.01) |
| H01M 4/134 | (2010.01) |
| H01M 10/0525 | (2010.01) |
| H01M 10/0568 | (2010.01) |
| H01M 4/136 | (2010.01) |
| H01M 4/38 | (2006.01) |
| H01M 4/525 | (2010.01) |
| H01M 4/485 | (2010.01) |
| H01M 4/587 | (2010.01) |
| H01M 4/58 | (2010.01) |
| H01M 4/62 | (2006.01) |
| H01M 10/0569 | (2010.01) |
| H01M 10/052 | (2010.01) |

(52) U.S. Cl.
CPC .......... *H01M 10/0567* (2013.01); *H01M 4/131* (2013.01); *H01M 4/134* (2013.01); *H01M 4/136* (2013.01); *H01M 4/386* (2013.01); *H01M 4/485* (2013.01); *H01M 4/525* (2013.01); *H01M 4/587* (2013.01); *H01M 4/5825* (2013.01); *H01M 4/623* (2013.01); *H01M 4/625* (2013.01); *H01M 6/168* (2013.01); *H01M 10/0525* (2013.01); *H01M 10/0568* (2013.01); *H01M 10/0569* (2013.01); *H01M 10/052* (2013.01); *H01M 2220/10* (2013.01); *H01M 2220/20* (2013.01); *H01M 2220/30* (2013.01); *H01M 2300/004* (2013.01); *Y02T 10/7011* (2013.01)

(58) Field of Classification Search
CPC ..................... H01M 10/0569; H01M 10/0525
See application file for complete search history.

(56) References Cited

U.S. PATENT DOCUMENTS

2012/0009486 A1    1/2012  Hayakawa et al.
2012/0308881 A1    12/2012 Tokuda et al.

FOREIGN PATENT DOCUMENTS

| JP | 2010 225522 | 10/2010 |
|---|---|---|
| JP | 2011 14379 | 1/2011 |
| JP | 2011 187440 | 9/2011 |
| JP | 2012 190699 | 10/2012 |
| WO | 2010 053485 | 4/2012 |
| WO | 2012 141270 | 10/2012 |
| WO | 2012 147818 | 11/2012 |

OTHER PUBLICATIONS

International Search Report Issued Nov. 5, 2013 in PCT/JP2013/072336 Filed Aug. 21, 2013.

*Primary Examiner* — Jane Rhee
(74) *Attorney, Agent, or Firm* — Oblon, McClelland, Maier & Neustadt, L.L.P

(57) ABSTRACT

The present invention provides a nonaqueous electrolytic solution capable of improving electrochemical characteristics at high temperatures and further capable of not only improving a capacity retention rate after a high-temperature cycle test but also decreasing a rate of increase of an electrode thickness, and also to provide an energy storage device using the same. A nonaqueous electrolytic solution having an electrolyte salt dissolved in a nonaqueous solvent, the nonaqueous electrolytic solution containing from 0.001 to 5% by mass of a diisocyanate compound represented by OCN-L-NCO (in the formula, L represents an alkylene group having from 4 to 12 carbon atoms) and further containing from 0.001 to 5% by mass of at least one selected from a specified phosphoric acid ester compound, a specified cyclic sulfonic acid ester compound, a specified isocyanate compound having an ester structure, and a specified triple bond-containing compound, and an energy storage device using the same, are disclosed.

11 Claims, No Drawings

NONAQUEOUS ELECTROLYTE SOLUTION AND ELECTRICITY STORAGE DEVICE USING SAME

TECHNICAL FIELD

The present invention relates to a nonaqueous electrolytic solution capable of improving electrochemical characteristics at high temperatures and also an energy storage device using the same.

BACKGROUND ART

An energy storage device, especially a lithium secondary battery, has been widely used recently for a power source of an electronic device, such as a mobile telephone, a notebook personal computer, etc., and a power source for an electric vehicle and an electric power storage. There is a high possibility that the battery mounted on such an electronic device or vehicle is used at midsummer high temperatures or under an environment warmed by generation of heat of the electronic device. In a thin electronic device, such as a tablet device, an ultrabook, etc., a laminate-type battery or a prismatic battery using a laminate film, such as a an aluminum laminate film, etc., for an outer packaging member is frequently used; however, since such a battery is thin, a problem that the battery is easily deformed due to expansion of the outer packaging member or the like is easily caused, and the matter that the deformation very likely influences the electronic device is problematic.

A lithium secondary battery is mainly constituted of a positive electrode and a negative electrode, each containing a material capable of absorbing and releasing lithium, and a nonaqueous electrolytic solution containing a lithium salt and a nonaqueous solvent; and a carbonate, such as ethylene carbonate (EC), propylene carbonate (PC), etc., is used as the nonaqueous solvent.

A lithium metal, a metal compound capable of absorbing and releasing lithium (e.g., a metal elemental substance, a metal oxide, an alloy with lithium, etc.), and a carbon material are known as the negative electrode of the lithium secondary battery. In particular, a nonaqueous electrolytic solution secondary battery using, as the carbon material, a carbon material capable of absorbing and releasing lithium, for example, coke or graphite (e.g, artificial graphite or natural graphite), etc., is widely put into practical use. Since the aforementioned negative electrode material stores/releases lithium and an electron at an extremely electronegative potential equal to the lithium metal, it has a possibility that a lot of solvents are subjected to reductive decomposition especially at high temperatures, and a part of the solvent in the electrolytic solution is reductively decomposed on the negative electrode regardless of the kind of the negative electrode material, so that there were involved such problems that the movement of a lithium ion is disturbed due to deposition of decomposition products, generation of a gas, or expansion of the electrode, thereby worsening battery characteristics, such as cycle property, especially at high temperatures, etc.; and that the battery is deformed due to expansion of the electrode. Furthermore, it is known that a lithium secondary battery using a lithium metal or an alloy thereof, or a metal elemental substance, such as tin, silicon, etc., or a metal oxide thereof as the negative electrode material may have a high initial battery capacity, but the battery capacity and the battery performance thereof, such as the cycle property, may be largely worsened especially at high temperatures since the micronized powdering of the material may be promoted during cycles, which brings about accelerated reductive decomposition of the nonaqueous solvent, as compared with the negative electrode formed of a carbon material, and the battery may be deformed due to expansion of the electrode.

Meanwhile, since a material capable of absorbing and releasing lithium, which is used as a positive electrode material, such as $LiCoO_2$, $LiMn_2O_4$, $LiNiO_2$, $LiFePO_4$, etc., stores and releases lithium and an electron at an electropositive voltage of 3.5 V or more on the lithium basis, it has a possibility that a lot of solvents are subjected to oxidative decomposition especially at high temperatures, and a part of the solvent in the electrolytic solution is oxidatively decomposed on the positive electrode regardless of the kind of the positive electrode material, so that there were involved such problems that the movement of a lithium ion is disturbed due to deposition of decomposition products or generation of a gas, thereby worsening battery characteristics, such as cycle property, etc.

Irrespective of the situation, the multifunctionality of electronic devices on which lithium secondary batteries are mounted is more and more advanced, and power consumption tends to increase. The capacity of lithium secondary battery is thus being much increased, and the space volume for the nonaqueous electrolytic solution in the battery is decreased by increasing the density of the electrode, or reducing the useless space volume in the battery, or the like. In consequence, it is a situation that the battery performance at high temperatures is easily worsened due to even a bit of decomposition of the nonaqueous electrolytic solution.

PTL 1 proposes a secondary battery containing an electrolytic solution including a diisocyanate compound as a nonaqueous electrolyte secondary battery capable of exhibiting a swelling suppression effect at the time of high-temperature storage.

PTL 1: JP-A 2011-14379

SUMMARY OF INVENTION

Technical Problem

Problems to be solved by the present invention are to provide a nonaqueous electrolytic solution capable of improving electrochemical characteristics at high temperatures and further capable of not only improving a discharge capacity retention rate after a high-temperature cycle test but also decreasing a rate of increase of an electrode thickness, and also to provide an energy storage device using the same.

Solution to Problem

The present inventors made extensive and intensive investigations regarding the performance of the nonaqueous electrolytic solution of the above-cited PTL 1.

As a result, according to the nonaqueous electrolytic solution of PTL 1, though the swelling of the battery after high-temperature storage can be improved, in the case of contemplating to achieve a higher capacity in the future, it may not be said that the nonaqueous electrolytic solution of PTL 1 is thoroughly satisfactory. Above all, PTL 1 does not disclose anything for a problem of decreasing a rate of increase of an electrode thickness following charge/discharge at all.

Then, in order to solve the above-described problem, the present inventors made extensive and intensive investigations. As a result, it has been found that, with respect to a nonaqueous electrolytic solution containing a specified diisocyanate compound, by further adding thereto at least one selected from a specified phosphoric acid ester compound, a specified cyclic sulfonic acid ester compound, an isocyanate compound having an ester structure, and a triple bond-containing compound, electrochemical characteristics at high temperatures may be improved, a discharge capacity retention rate after a high-temperature cycle may be improved, and a rate of increase of an electrode thickness may be decreased, leading to accomplishment of the present invention.

Specifically, the present invention provides the following (1) and (2).

(1) A nonaqueous electrolytic solution having an electrolyte salt dissolved in a nonaqueous solvent, the nonaqueous electrolytic solution comprising from 0.001 to 5% by mass of a diisocyanate compound represented by the following general formula (I) and further comprising from 0.001 to 5% by mass of at least one selected from a phosphoric acid ester compound represented by the following general formula (II), a cyclic sulfonic acid ester compound represented by the following general formula (III), an isocyanate compound having an ester structure and represented by the following general formula (IV), and a triple bond-containing compound represented by the following general formula (V).

OCN-L-NCO  (I)

(In the formula, L represents an optionally branched alkylene group having from 4 to 12 carbon atoms.)

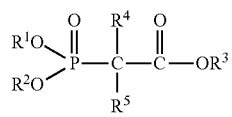

(In the formula, each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom; $R^3$ represents an alkyl group having from 1 to 6 carbon atoms, an alkenyl group having from 2 to 6 carbon atoms, or an alkynyl group having from 3 to 6 carbon atoms; and each of $R^4$ and $R^5$ independently represents a hydrogen atom, a halogen atom, or an alkyl group having from 1 to 4 carbon atoms.)

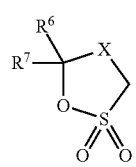

(In the formula, each of $R^6$ and $R^7$ independently represents a hydrogen atom, an alkyl group having from 1 to 6 carbon atoms, in which at least one hydrogen atom may be substituted with a halogen atom, or a halogen atom; X represents —CH($OR^8$)— or —C(=O)—; and $R^8$ represents a formyl group, an alkyl carbonyl group having from 2 to 7 carbon atoms, an alkenyl carbonyl group having from 3 to 7 carbon atoms, an alkynyl carbonyl group having from 3 to 7 carbon atoms, or an aryl carbonyl group having from 7 to 13 carbon atoms. At least one hydrogen atom in $R^8$ may be substituted with a halogen atom.)

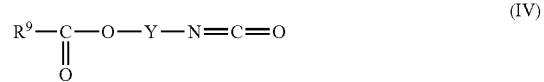

(In the formula, $R^9$ represents an alkyl group having from 1 to 6 carbon atoms, an alkenyl group having from 2 to 6 carbon atoms, an aryl group having from 6 to 12 carbon atoms, an alkyloxy group having from 1 to 6 carbon atoms, an alkenyloxy group having from 2 to 6 carbon atoms, an isocyanatoalkyloxy group having from 2 to 6 carbon atoms, or an aryloxy group having from 6 to 12 carbon atoms, in each of which at least one hydrogen atom may be substituted with a halogen atom; and Y represents a linear or branched alkylene group having from 1 to 6 carbon atoms, in which at least one hydrogen atom may be substituted with a halogen atom, or a divalent linking group having from 2 to 6 carbon atoms and containing at least one ether bond.)

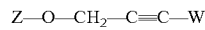

Z—O—CH$_2$—C≡C—W  (V)

(In the formula, Z represents $R^{10}$—O—C(=O)—, $R^{11}$—O—C(=O)—C(=O)—, or $R^{12}$—S(=O)$_2$—; W represents a hydrogen atom or —CH$_2$—O—S(=O)$_2$—$R^{13}$; each of $R^{10}$ to $R^{13}$ independently represents an alkyl group having from 1 to 6 carbon atoms, an alkenyl group having from 2 to 6 carbon atoms, an alkynyl group having from 2 to 6 carbon atoms, or an aryl group having from 6 to 12 carbon atoms, in each of which at least one hydrogen atom may be substituted with a halogen atom, provided that when Z is $R^{10}$—O—C(=O)— or $R^{11}$—O—C(=O)—C(=O)—, then W is a hydrogen atom.)

(2) An energy storage device comprising a positive electrode, a negative electrode, and a nonaqueous electrolytic solution having an electrolyte salt dissolved in a nonaqueous solvent, wherein the nonaqueous electrolytic solution comprises from 0.001 to 5% by mass of a diisocyanate compound represented by the foregoing general formula (I) and further comprises from 0.001 to 5% by mass of at least one selected from a phosphoric acid ester compound represented by the foregoing general formula (II), a cyclic sulfonic acid ester compound represented by the foregoing general formula (III), an isocyanate compound having an ester structure and represented by the foregoing general formula (IV), and a triple bond-containing compound represented by the foregoing general formula (V).

Advantageous Effects of Invention

According to the present invention, it is possible to provide a nonaqueous electrolytic solution capable of not only improving the capacity retention rate after a high-temperature cycle but also decreasing the rate of increase of an electrode thickness and an energy storage device using the same, such as a lithium battery, etc.

DESCRIPTION OF EMBODIMENTS

[Nonaqueous Electrolytic Solution]

The nonaqueous electrolytic solution of the present invention is concerned with a nonaqueous electrolytic solution having an electrolyte salt dissolved in a nonaqueous solvent, the nonaqueous electrolytic solution comprising from 0.001 to 5% by mass of a diisocyanate compound represented by the following general formula (I) and further comprising from 0.001 to 5% by mass of at least one selected from a phosphoric acid ester compound represented by the following general formula (II), a cyclic sulfonic acid ester compound represented by the following general formula (III), an isocyanate compound having an ester structure and represented by the following general formula (IV), and a triple bond-containing compound represented by the following general formula (V).

OCN-L-NCO            (I)

(In the formula, L represents an optionally branched alkylene group having from 4 to 12 carbon atoms.)

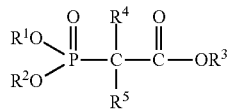 (II)

(In the formula, each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom; $R^3$ represents an alkyl group having from 1 to 6 carbon atoms, an alkenyl group having from 2 to 6 carbon atoms, or an alkynyl group having from 3 to 6 carbon atoms; and each of $R^4$ and $R^5$ independently represents a hydrogen atom, a halogen atom, or an alkyl group having from 1 to 4 carbon atoms.)

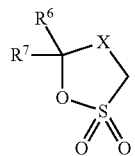 (III)

(In the formula, each of $R^6$ and $R^7$ independently represents a hydrogen atom, an alkyl group having from 1 to 6 carbon atoms, in which at least one hydrogen atom may be substituted with a halogen atom, or a halogen atom; X represents —CH($OR^8$)— or —C(=O)—; and $R^8$ represents a formyl group, an alkyl carbonyl group having from 2 to 7 carbon atoms, an alkenyl carbonyl group having from 3 to 7 carbon atoms, an alkynyl carbonyl group having from 3 to 7 carbon atoms, or an aryl carbonyl group having from 7 to 13 carbon atoms. At least one hydrogen atom in $R^8$ may be substituted with a halogen atom.)

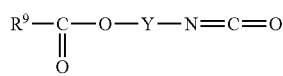 (IV)

(In the formula, $R^9$ represents an alkyl group having from 1 to 6 carbon atoms, an alkenyl group having from 2 to 6 carbon atoms, an aryl group having from 6 to 12 carbon atoms, an alkyloxy group having from 1 to 6 carbon atoms, an alkenyloxy group having from 2 to 6 carbon atoms, an isocyanatoalkyloxy group having from 2 to 6 carbon atoms, or an aryloxy group having from 6 to 12 carbon atoms, in each of which at least one hydrogen atom may be substituted with a halogen atom; and Y represents a linear or branched alkylene group having from 1 to 6 carbon atoms, in which at least one hydrogen atom may be substituted with a halogen atom, or a divalent linking group having from 2 to 6 carbon atoms and containing at least one ether bond.)

Z—O—$CH_2$—C≡C—W        (V)

(In the formula, Z represents $R^{10}$—O—C(=O)—, $R^{11}$—O—C(=O)—C(=O)—, or $R^{12}$—S(=O)$_2$—; W represents a hydrogen atom or —$CH_2$—O—S(=O)$_2$—$R^{13}$; each of $R^{10}$ to $R^{13}$ independently represents an alkyl group having from 1 to 6 carbon atoms, an alkenyl group having from 2 to 6 carbon atoms, an alkynyl group having from 2 to 6 carbon atoms, or an aryl group having from 6 to 12 carbon atoms, in each of which at least one hydrogen atom may be substituted with a halogen atom, provided that when Z is $R^{10}$—O—C(=O)— or $R^{11}$—O—C(=O)—C(=O)—, then W is a hydrogen atom.)

Although the reason why the nonaqueous electrolytic solution of the present invention is capable of significantly improving electrochemical characteristics in a broad temperature range has not always been elucidated yet, the following may be considered.

The diisocyanate compound represented by the general formula (I), which is used in combination in the present invention, is decomposed on the negative electrode to form a surface film; however, when charge/discharge is repeated at high temperatures, the surface film grows due to dissolution and reformation of the surface film, whereby the thickness of the negative electrode largely increases. Meanwhile, when the at least one compound having two or more functional groups, which is selected from the phosphoric acid ester compound represented by the general formula (II), the cyclic sulfonic acid ester compound represented by the general formula (III), the isocyanate compound having an ester structure and represented by the general formula (IV), and the triple bond-containing compound represented by the general formula (V), is used in combination with the diisocyanate compound, the decomposition of the diisocyanate compound on the negative electrode may be suppressed. In addition, at the same time, it has become clear that a firm composite surface film due to the compounds containing two or more functional group, such as the diisocyanate compound and the phosphoric acid ester compound represented by the general formula (II), the diisocyanate compound and the cyclic sulfonic acid ester compound represented by the general formula (III), the diisocyanate compound and the isocyanate compound having an ester structure and represented by the general formula (IV), or the diisocyanate compound and the triple bond-containing compound represented by the general formula (V), or the like, is quickly formed on an active point on the negative electrode, whereby not only a high-temperature cycle property is improved, but also the growth of the surface film is suppressed to thereby suppress the increase of the electrode thickness much more.

The diisocyanate compound which is contained in the nonaqueous electrolytic solution of the present invention is represented by the following general formula (I).

OCN-L-NCO            (I)

(In the formula, L represents an optionally branched alkylene group having from 4 to 12 carbon atoms.)

In the foregoing general formula (I), suitable examples of the optionally branched alkylene group having from 4 to 12 carbon atoms, which is represented by L, include alkylene groups, such as a butane-1,4-diyl group, a butane-1,3-diyl group, a 2-methylpropane-1,2-diyl group, a butane-1,1-diyl group, a pentane-1,5-diyl group, a hexane-1,6-diyl group, a 2-methylpentane-1,5-diyl group, a heptane-1,7-diyl group, an octane-1,8-diyl group, a nonane-1,9-diyl group, a 2,3,4- trimethylhexane-1,6-diyl group, a 2,2,4-trimethylhexane-1,6-diyl group, a decane-1,10-diyl group, an undecane-1,11-diyl group, a dodecane-1,12-diyl group, etc.

Of those, a butane-1,4-diyl group, a butane-1,3-diyl group, a 2-methylpropane-1,3-diyl group, a pentane-1,5-diyl group, a hexane-1,6-diyl group, a 2-methylpentane-1,5-diyl group, a heptane-1,7-diyl group, an octane-1,8-diyl group, a nonane-1,9-diyl group, a 2,3,4-trimethylhexane-1,6-diyl group, a 2,2,4-trimethylhexane-1,6-diyl group, or a decane-1,10-diyl group is preferred; a butane-1,4-diyl group, a pentane-1,5-diyl group, a hexane-1,6-diyl group, a heptane-1,7-diyl group, or an octane-1,8-diyl group is more preferred; and a hexane-1,6-diyl group is especially preferred.

Suitable examples of the compound represented by the foregoing general formula (I) include 1,4-diisocyanatobutane, 1,3-diisocyanatobutane, 1,3-diisocyanato-2-methylpropane, 1,1-diisocyanatobutane, 1,5-diisocyanatopentane, 1,6-diisocyanatohexane, 1,5-diisocyanato-2-methylpentane, 1,7-diisocyanatoheptane, 1,8-diisocyanatooctane, 1,9-diisocyanatononane, 1,6-diisocyanato-2,3,4-trimethylhexane, 1,6-diisocyanato-2,2,4-trimethylhexane, 1,10-diisocyanatodecane, 1,11-diisocyanatoundecane, and 1,12-diisocyanatododecane.

Of those, 1,4-diisocyanatobutane, 1,3-diisocyanatobutane, 1,3-diisocyanato-2-methylpropane, 1,5-diisocyanatopentane, 1,6-diisocyanatohexane, 1,5-diisocyanato-2-methylpentane, 1,7-diisocyanatoheptane, 1,8-diisocyanatooctane, 1,9-diisocyanatononane, 1,6-diisocyanato-2,3,4-trimethylhexane, 1,6-diisocyanato-2,2,4-trimethylhexane, or 1,10-diisocyanatodecane is preferred; 1,4-diisocyanatobutane, 1,5-diisocyanatopentane, 1,6-diisocyanatohexane, 1,7-diisocyanatoheptane, or 1,8-diisocyanatooctane is more preferred; and 1,6-diisocyanatohexane is especially preferred.

In the nonaqueous electrolytic solution of the present invention, a content of the diisocyanate compound represented by the foregoing general formula (I) is preferably from 0.001 to 5% by mass in the nonaqueous electrolytic solution. When the content is 5% by mass or less, there is less concern that a surface film is excessively formed on the electrode, thereby causing worsening of a high-temperature cycle property, and when it is 0.001% by mass or more, a surface film is sufficiently formed, thereby increasing an effect for improving a high-temperature cycle property. The content is preferably 0.01% by mass or more, and more preferably 0.1% by mass or more in the nonaqueous electrolytic solution, and an upper limit thereof is preferably 4% by mass or less, and more preferably 2% by mass or less.

The phosphoric acid ester compound which is contained in the nonaqueous electrolytic solution of the present invention is represented by the following general formula (II).

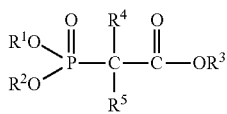

(II)

(In the formula, each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom; $R^3$ represents an alkyl group having from 1 to 6 carbon atoms, an alkenyl group having from 2 to 6 carbon atoms, or an alkynyl group having from 3 to 6 carbon atoms; and each of $R^4$ and $R^5$ independently represents a hydrogen atom, a halogen atom, or an alkyl group having from 1 to 4 carbon atoms.)

Each of $R^1$ and $R^2$ as described above independently represents an alkyl group having from 1 to 6 carbon atoms or a halogenated alkyl group having from 1 to 6 carbon atoms, in which at least one hydrogen atom is substituted with a halogen atom.

Suitable examples of $R^1$ and $R^2$ as described above include linear alkyl groups, such as a methyl group, an ethyl group, an n-propyl group, an n-butyl group, an n-pentyl group, an n-hexyl group, etc.; branched alkyl groups, such as an isopropyl group, a sec-butyl group, a tert-butyl group, a tert-amyl group, etc.; and alkyl groups in which a part of hydrogen atoms is substituted with a fluorine atom, such as a fluoromethyl group, a 2,2,2-trifluoroethyl group, etc.

Of those, a methyl group, an ethyl group, an n-propyl group, an isopropyl group, or a 2,2,2-trifluoroethyl group is preferred, with a methyl group or an ethyl group being more preferred.

Suitable examples of $R^3$ as described above include linear alkyl groups, such as a methyl group, an ethyl group, an n-propyl group, an n-butyl group, an n-pentyl group, an n-hexyl group, etc.; branched alkyl groups, such as an isopropyl group, a sec-butyl group, a tert-butyl group, a tert-amyl group, etc.; alkenyl groups, such as a vinyl group, a 2-propenyl group, a 2-butenyl group, a 3-butenyl group, a 4-pentenyl group, a 5-hexenyl group, a 2-methyl-2-propenyl group, a 3-methyl-2-butenyl group, etc.; and alkynyl groups, such as a 2-propynyl group, a 2-butynyl group, a 3-butynyl group, a 4-pentynyl group, a 5-hexynyl group, a 1-methyl-2-propynyl group, a 1,1-dimethyl-2-propynyl group, etc.

Of those, a methyl group, an ethyl group, an n-propyl group, an isopropyl group, a 2-propenyl group, a 2-butenyl group, a 2-propynyl group, a 2-butynyl group, or a 1-methyl-2-propynyl group is preferred, with a methyl group, an ethyl group, a 2-propenyl group, a 2-propynyl group, or a 1-methyl-2-propynyl group being more preferred.

Each of $R^4$ and $R^5$ as described above independently represents a hydrogen atom, a halogen atom, or an alkyl group having from 1 to 4 carbon atoms.

Suitable examples of $R^4$ and $R^5$ as described above include a hydrogen atom, a fluorine atom, a chlorine atom, linear alkyl groups, such as a methyl group, an ethyl group, an n-propyl group, an n-butyl group, etc., and branched alkyl groups, such as an isopropyl group, a sec-butyl group, a tert-butyl group, etc.

Of those, a hydrogen atom, a fluorine atom, a methyl group, an ethyl group, an n-propyl group, or an isopropyl group is preferred, with a hydrogen atom, a fluorine atom, a methyl group, or an ethyl group being more preferred.

Suitable examples of the phosphoric acid ester compound represented by the foregoing general formula (II) include the following compounds and the like.

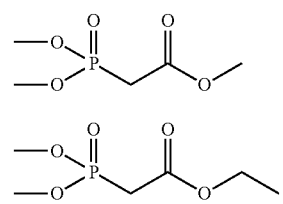

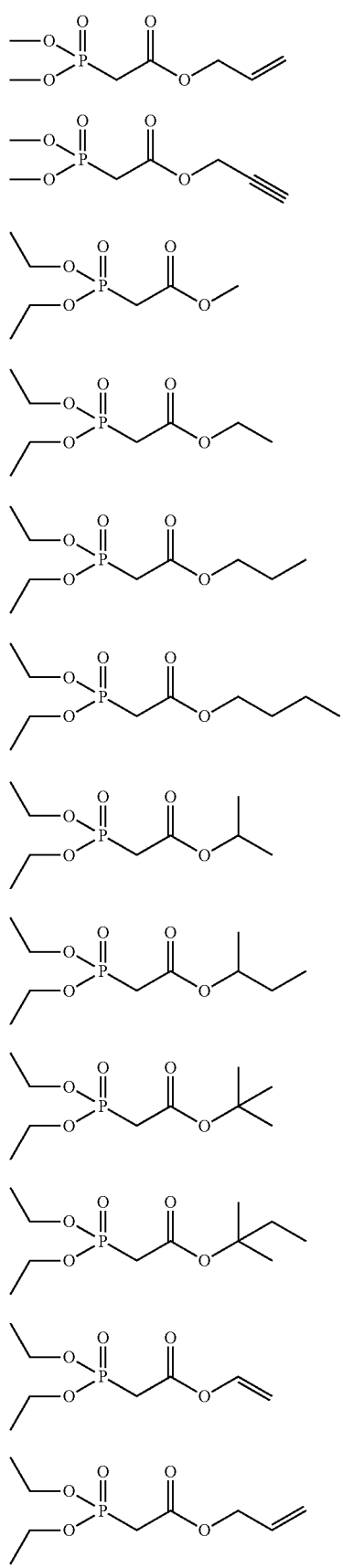
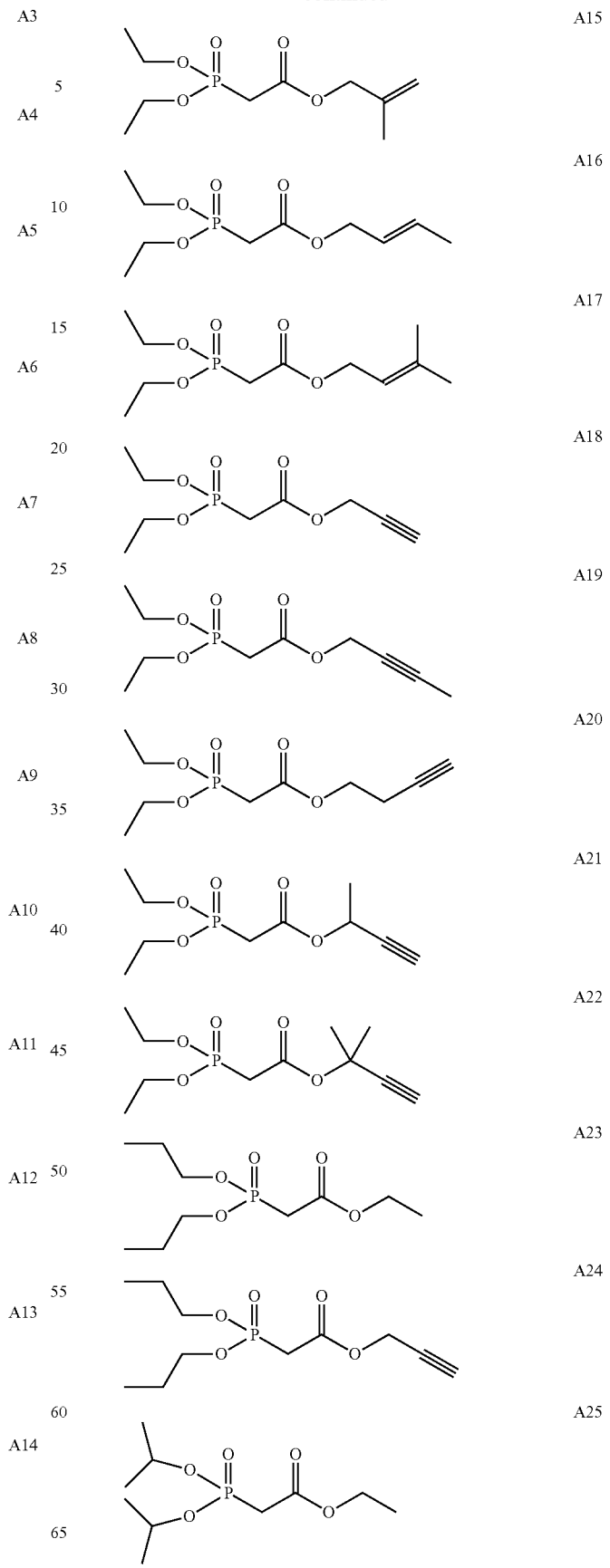

A26 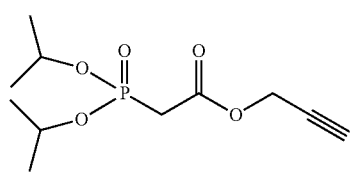
A27 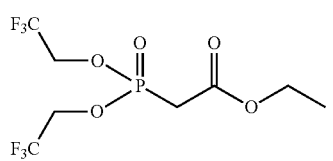
A28 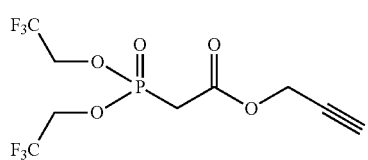
A29 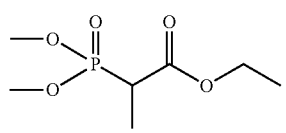
A30 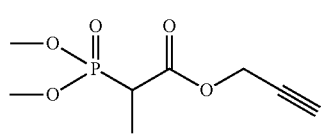
A31 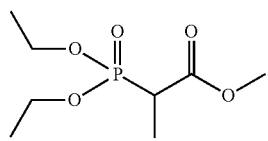
A32 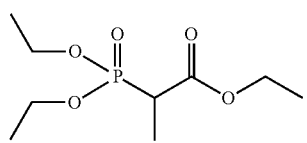
A33 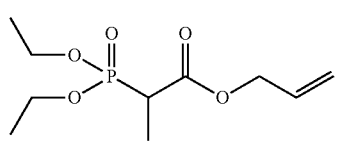
A34 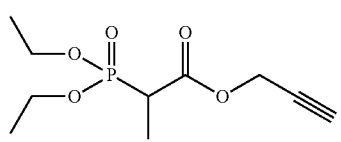
A35 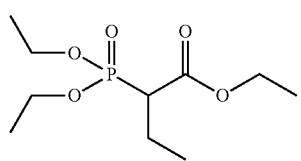
A36 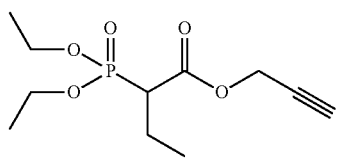
A37 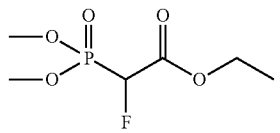
A38 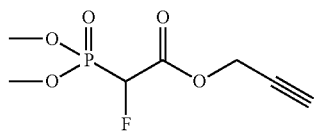
A39 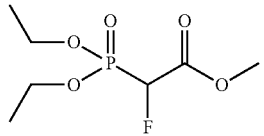
A40 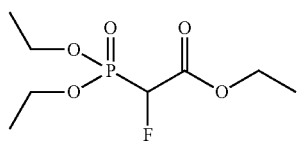
A41 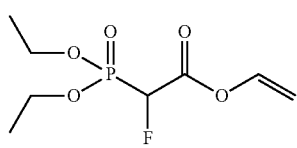
A42 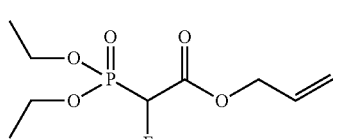
A43 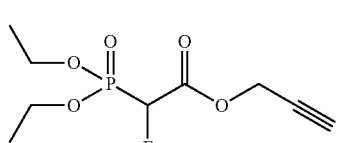
A44 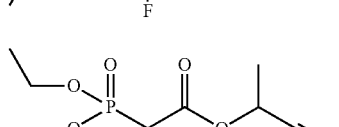
A45 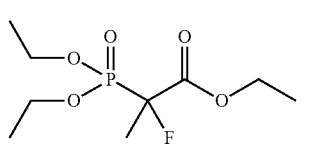

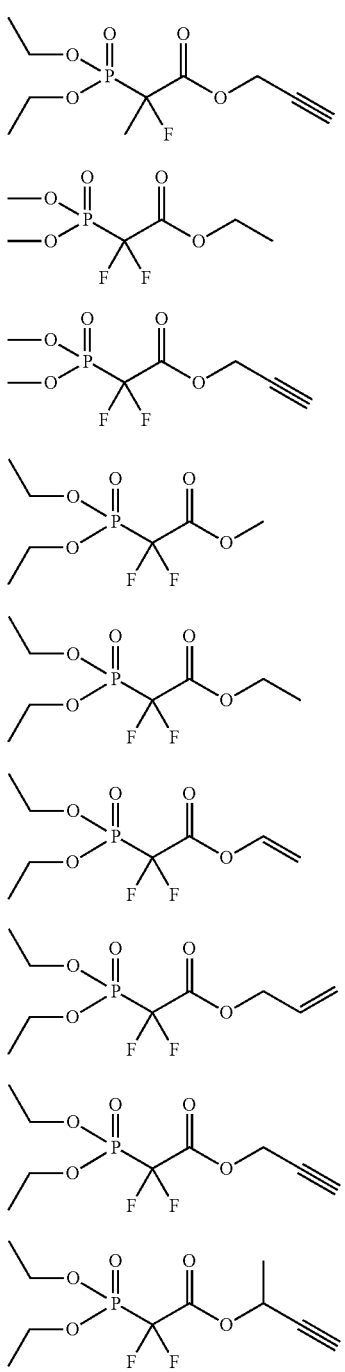

pound A37), methyl 2-(diethoxyphosphoryl)-2-fluoroacetate (Compound A39), ethyl 2-(diethoxyphosphoryl)-2-fluoroacetate (Compound A40), 2-propenyl 2-(diethoxyphosphoryl)-2-fluoroacetate (Compound A42), 2-propynyl 2-(diethoxyphosphoryl)-2-fluoroacetate (Compound A43), 1-methyl-2-propynyl 2-(diethoxyphosphoryl)-2-fluoroacetate (Compound A44), ethyl 2-(dimethoxyphosphoryl)-2,2-difluoroacetate (Compound A47), methyl 2-(diethoxyphosphoryl)-2,2-difluoroacetate (Compound A49), ethyl 2-(diethoxyphosphoryl)-2,2-difluoroacetate (Compound A50), 2-propenyl 2-(diethoxyphosphoryl)-2,2-difluoroacetate (Compound A52), 2-propynyl 2-(diethoxyphosphoryl)-2,2-difluoroacetate (Compound A53), or 1-methyl-2-propynyl 2-(diethoxyphosphoryl)-2,2-difluoroacetate (Compound A54) is more preferred.

In the nonaqueous electrolytic solution of the present invention, a content of the phosphoric acid ester compound represented by the foregoing general formula (II) is preferably from 0.001 to 5% by mass in the nonaqueous electrolytic solution. When the content is 5% by mass or less, there is less concern that a surface film is excessively formed on the electrode, thereby causing worsening of a high-temperature cycle property, and when it is 0.001% by mass or more, a surface film is sufficiently formed, thereby increasing an effect for improving a high-temperature cycle property. The content is preferably 0.01% by mass or more, and more preferably 0.1% by mass or more in the nonaqueous electrolytic solution, and an upper limit thereof is preferably 4% by mass or less, and more preferably 2% by mass or less.

The cyclic sulfonic acid ester compound which is contained in the nonaqueous electrolytic solution of the present invention is represented by the following general formula (III).

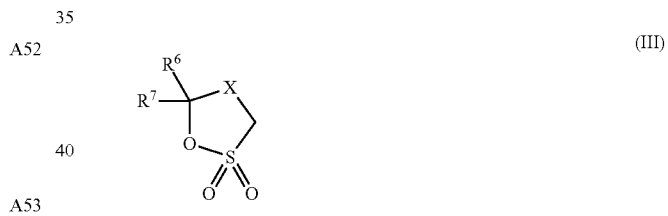

(III)

Each of $R^6$ and $R^7$ in the foregoing general formula (III) independently represents a hydrogen atom, an alkyl group having from 1 to 6 carbon atoms, in which at least one hydrogen atom may be substituted with a halogen atom, or a halogen atom. $R^6$ and $R^7$ are each more preferably a hydrogen atom, an alkyl group having from 1 to 4 carbon atoms, in which at least one hydrogen atom may be substituted with a halogen atom, or a halogen atom; and still more preferably a hydrogen atom or an alkyl group having 1 or 2 carbon atoms, in which at least one hydrogen atom may be substituted with a halogen atom.

Specifically, suitable examples of $R^6$ and $R^7$ as described above include a hydrogen atom, linear alkyl groups, such as a methyl group, an ethyl group, an n-propyl group, an n-butyl group, an n-pentyl group, an n-hexyl group, etc., branched alkyl groups, such as an isopropyl group, a sec-butyl group, a tert-butyl group, a tert-amyl group, etc., fluoroalkyl groups, such as a fluoromethyl group, a difluoromethyl group, a trifluoromethyl group, a 2,2,2-trifluoroethyl group, etc., and a fluorine atom.

Of those, a hydrogen atom, a methyl group, an ethyl group, an n-propyl group, a difluoromethyl group, or a trifluoromethyl group is preferred, with a hydrogen atom or a methyl group being more preferred.

Of those, compounds having the foregoing structures of A2, A4 to A6, A14, A18, A21 to A40, A42 to A50, and A52 to A54 are preferred; and ethyl 2-(dimethoxyphosphoryl)acetate (Compound A2), 2-propynyl 2-(dimethoxyphosphoryl)acetate (Compound A4), methyl 2-(diethoxyphosphoryl)acetate (Compound A5), ethyl 2-(diethoxyphosphoryl)acetate (Compound A6), 2-propenyl 2-(diethoxyphosphoryl)acetate (Compound A14), 2-propynyl 2-(diethoxyphosphoryl)acetate (Compound A18), 1-methyl-2-propynyl 2-(diethoxyphosphoryl)acetate (Compound A21), 2-propynyl 2-(dimethoxyphosphoryl)propanoate (Compound A30), 2-propynyl 2-(diethoxyphosphoryl)propanoate (Compound A34), ethyl 2-(dimethoxyphosphoryl)-2-fluoroacetate (Com- X as described above represents —CH(OR⁸)— or —C(=O)—; and R⁸ represents a formyl group, an alkyl carbonyl group having from 2 to 7 carbon atoms, an alkenyl carbonyl group having from 3 to 7 carbon atoms, an alkynyl carbonyl group having from 3 to 7 carbon atoms, or an aryl carbonyl group having from 7 to 13 carbon atoms. Furthermore, at least one hydrogen atom in R⁸ may be substituted with a halogen atom.

R⁸ as described above is more preferably a formyl group, an alkyl carbonyl group having from 2 to 7 carbon atoms, or an alkenyl carbonyl group having from 3 to 5 carbon atoms, and still more preferably a formyl group or an alkyl carbonyl group having from 2 to 5 carbon atoms.

Specifically, suitable examples of R⁸ as described above include alkyl carbonyl groups, such as a formyl group, an acetyl group, a propionyl group, a butyryl group, an isobutyryl group, a pivaloyl group, a trifluoroacetyl group, etc.; alkenyl carbonyl groups, such as an acryloyl group, a methacryloyl group, a crotonoyl group, etc.; alkynyl carbonyl groups, such as a propioloyl group, etc.; aryl carbonyl groups, such as a benzoyl group, a 2-methylbenzoyl group, a 3-methylbenzoyl group, a 4-methylbenzoyl group, a 2,4-dimethylbenzoyl group, a 2,6-dimethylbenzoyl group, a 3,4-dimethylbenzoyl group, a 2,4,6-trimethylbenzoyl group, a 2-fluorobenzoyl group, a 3-fluorobenzoyl group, a 4-fluorobenzoyl group, a 2,4-difluorobenzoyl group, a 2,6-difluorobenzoyl group, a 3,4-difluorobenzoyl group, a 2,4,6-trifluorobenzoyl group, a 2-trifluoromethylbenzoyl group, a 4-trifluoromethylbenzoyl group, etc.; and the like.

Of those, a formyl group, an acetyl group, a propionyl group, a butyryl group, a pivaloyl group, an acryloyl group, or a methacryloyl group is preferred, with an acetyl group and a propionyl group being more preferred.

Suitable examples of the cyclic sulfonic acid ester compound represented by the foregoing general formula (III) include the following compounds and the like.

B1
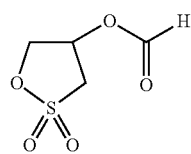

B2
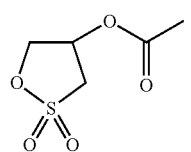

B3
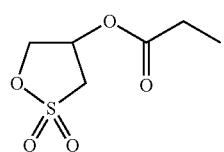

B4
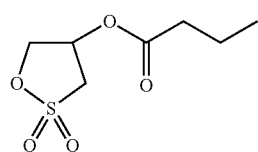

-continued

B5
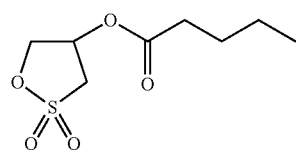

B6
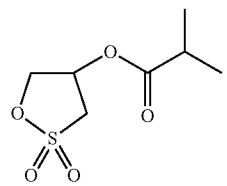

B7
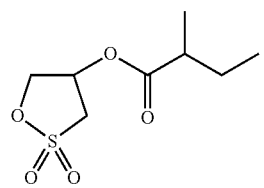

B8
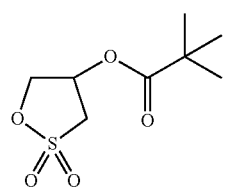

B9
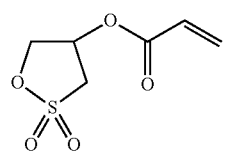

B10
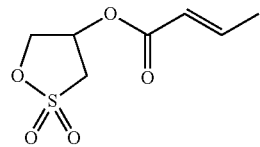

B11
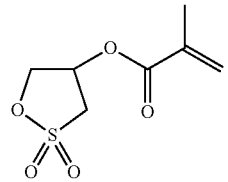

B12
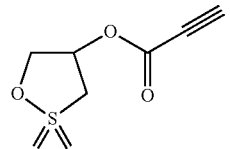

B13

B14 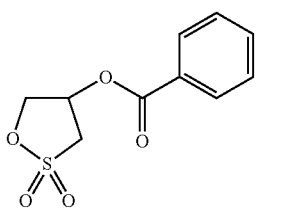

B15 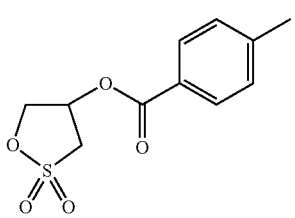

B16 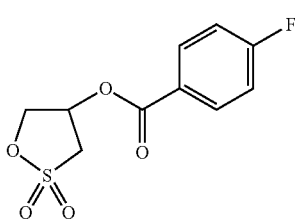

B17 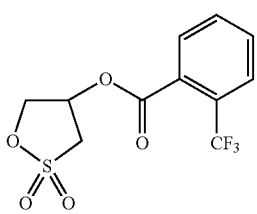

B18 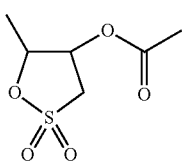

B19 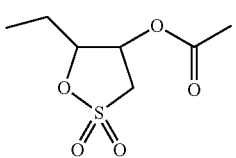

B20 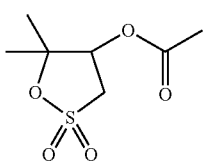

B21 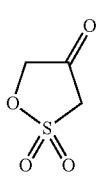

B22 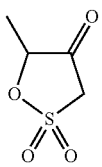

B23 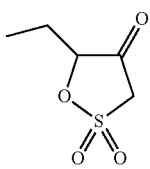

B24 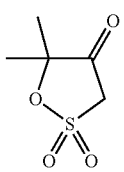

B25 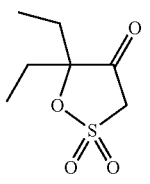

Of those, compounds having the foregoing structures of B1 to B4, B6, B8, B9, B11, and B22 to B25 are preferred; and 2,2-dioxide-1,2-oxathiolane-4-yl acetate (Compound B2), 2,2-dioxide-1,2-oxathiolane-4-yl propionate (Compound B3), 5-methyl-1,2-oxathiolane-4-one 2,2-dioxide (Compound B22), or 5,5-dimethyl-1,2-oxathiolane-4-one 2,2-dioxide (Compound B24) is more preferred.

In the nonaqueous electrolytic solution of the present invention, a content of the cyclic sulfonic acid ester compound represented by the general formula (III) is preferably from 0.001 to 5% by mass in the nonaqueous electrolytic solution. When the content is 5% by mass or less, there is less concern that a surface film is excessively formed on the electrode, thereby causing worsening of a high-temperature cycle property, and when it is 0.001% by mass or more, a surface film is sufficiently formed, thereby increasing an effect for improving a high-temperature cycle property. The content is preferably 0.01% by mass or more, and more preferably 0.1% by mass or more in the nonaqueous electrolytic solution, and an upper limit thereof is preferably 4% by mass or less, and more preferably 2% by mass or less.

The isocyanate compound having an ester structure, which is contained in the nonaqueous electrolytic solution of the present invention, is represented by the following general formula (IV).

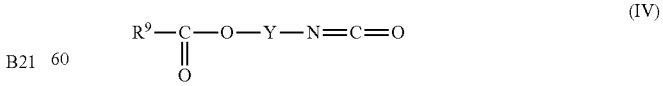

(IV)

$R^9$ in the foregoing general formula (IV) represents an alkyl group having from 1 to 6 carbon atoms, an alkenyl group having from 2 to 6 carbon atoms, an aryl group having from 6 to 12 carbon atoms, an alkyloxy group having from 1 to 6 carbon atoms, an alkenyloxy group having from 2 to 6 carbon atoms, an isocyanatoalkyloxy group having from 2 to 6 carbon atoms, or an aryloxy group having from 6 to 12 carbon atoms, in each of which at least one hydrogen atom may be substituted with a halogen atom.

$R^9$ as described above is preferably an alkyl group having from 1 to 6 carbon atoms, an alkenyl group having from 2 to 6 carbon atoms, or an aryl group having from 6 to 10 carbon atoms; more preferably an alkyl group having from 1 to 6 carbon atoms or an alkenyl group having from 2 to 6 carbon atoms; and still more preferably an alkyl group having from 1 to 4 carbon atoms or an alkenyl group having from 2 to 4 carbon atoms.

Suitable examples of $R^9$ as described above include alkyl groups, such as a methyl group, an ethyl group, an n-propyl group, an n-butyl group, an n-pentyl group, an n-hexyl group, an isopropyl group, a sec-butyl group, a tert-butyl group, etc.; alkenyl groups, such as a vinyl group, an allyl group, a 1-propen-1-yl group, a 2-buten-1-yl group, a 3-buten-1-yl group, a 4-penten-1-yl group, a 5-hexen-1-yl group, a 1-propen-2-yl group, a 3-methyl-2-buten-1-yl group, etc.; alkyloxy groups, such as a methoxy group, an ethoxy group, a propoxy group, etc.; alkenyloxy groups, such as a vinyloxy group, an allyloxy group, etc.; isocyanatoalkyloxy groups, such as an isocyanatoethyloxy group, etc.; aryl groups, such as a phenyl group, a 2-methylphenyl group, a 3-methylphenyl group, a 4-methylphenyl group, a 4-tert-butylphenyl group, a 2,4,6-trimethylphenyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 2,4,6-trifluorophenyl group, a pentafluorophenyl group, a 4-trifluoromethylphenyl group, etc.; and aryloxy groups, such as a phenyloxy group, a 2-methylphenyloxy group, a 3-methylphenyloxy group, a 4-methylphenyloxy group, a 4-tert-butylphenyloxy group, a 2,4,6-trimethylphenyloxy group, a 2-fluorophenyloxy group, a 3-fluorophenyloxy group, a 4-fluorophenyloxy group, a 2,4-difluorophenyloxy group, a 2,6-difluorophenyloxy group, a 3,4-difluorophenyloxy group, a 2,4,6-trifluorophenyloxy group, a pentafluorophenyloxy group, a 4-trifluoromethylphenyloxy group, etc.

Of those, a methyl group, an ethyl group, a vinyl group, a 1-propen-2-yl group, a phenyl group, or a 4-methylphenyl group is preferred, with a methyl group, a vinyl group, or a 1-propen-2-yl group being more preferred.

Y as described above represents a linear or branched alkylene group having from 1 to 6 carbon atoms, in which at least one hydrogen atom may be substituted with a halogen atom, or a divalent linking group having from 2 to 6 carbon atoms and containing at least one ether bond, and Y is more preferably an alkylene group.

Suitable examples of Y as described above include alkylene groups, such as a methylene group, an ethane-1,2-diyl group, an ethane-1,1-diyl group, a propane-1,3-diyl group, a propane-1,2-diyl group, a propane-1,1-diyl group, a butane-1,4-diyl group, a butane-1,3-diyl group, a 2-methylpropane-1,2-diyl group, a pentane-1,5-diyl group, a hexane-1,6-diyl group, etc.; halogenated alkylene groups, such as a monofluoromethylene group, a difluoromethylene group, a 2,2-difluoropropane-1,3-diyl group, etc.; and alkylene groups containing an ether bond, such as a 3-oxapentane-1,5-diyl group, a 4-oxaheptane-2,7-diyl group, a 3,6-dioxaoctane-1,8-diyl group, etc.

Of those, a methylene group, an ethane-1,2-diyl group, an ethane-1,1-diyl group, a propane-1,3-diyl group, a propane-1,2-diyl group, a propane-1,1-diyl group, a butane-1,4-diyl group, a butane-1,3-diyl group, a 2-methylpropane-1,2-diyl group, a 3-oxapentane-1,5-diyl group, or a 3,6-dioxaoctane-1,8-diyl group is preferred, with an ethane-1,2-diyl group, a propane-1,3-diyl group, a propane-1,2-diyl group, or a 3-oxapentane-1,5-diyl group being more preferred.

Suitable examples of the isocyanate compound having an ester structure and represented by the foregoing general formula (IV) include the following compounds and the like.

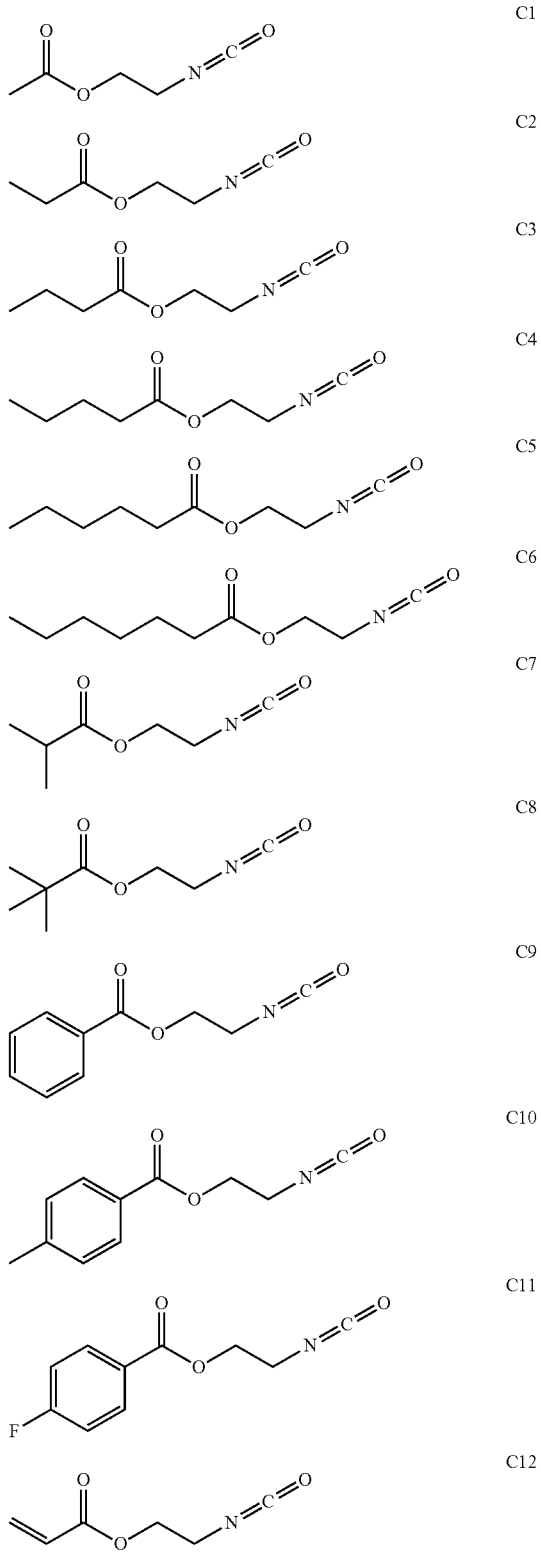

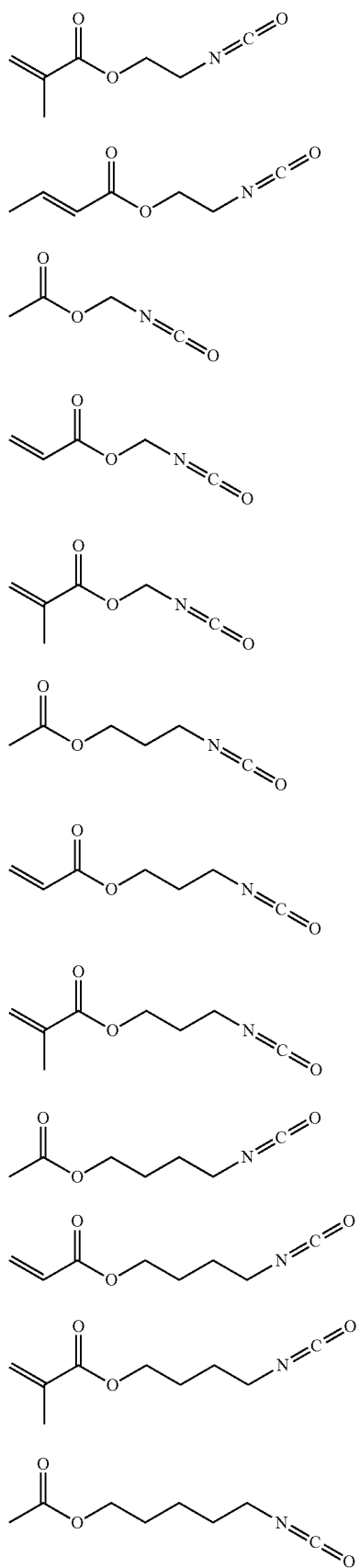
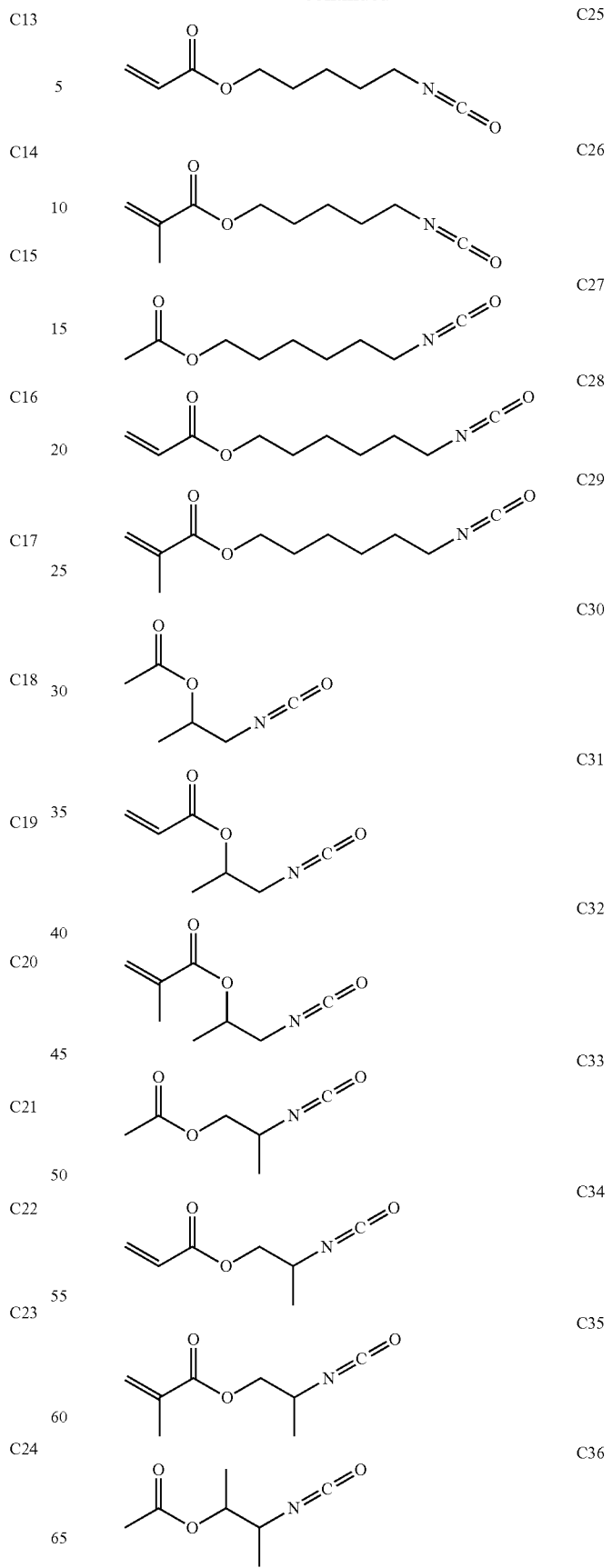

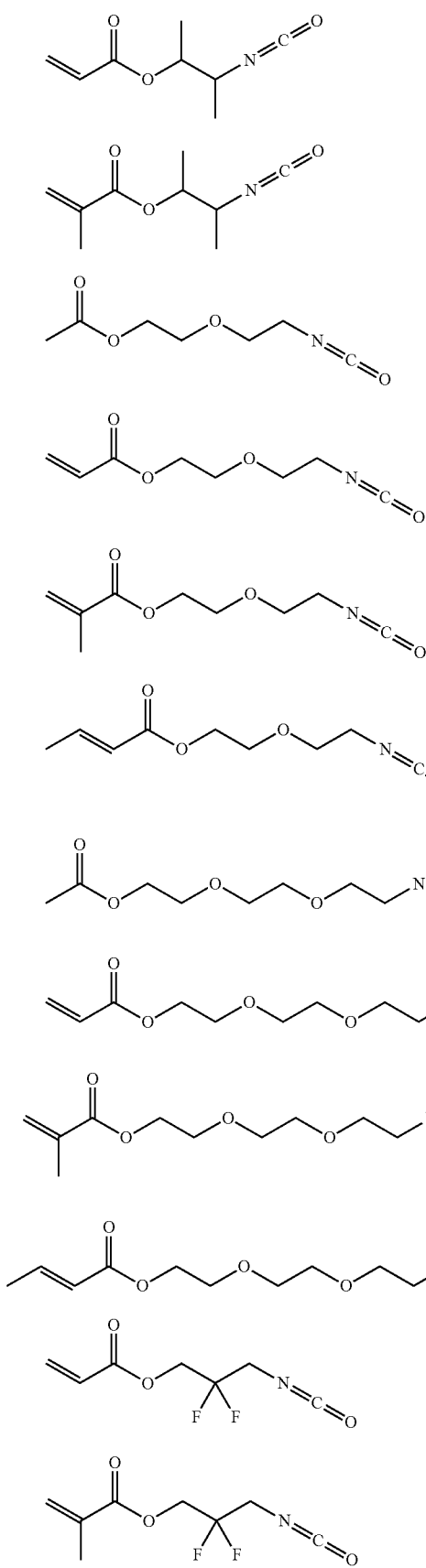

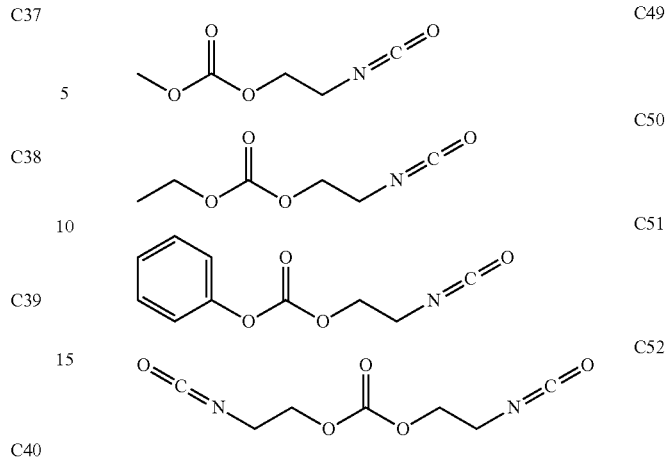

Of the isocyanate compounds having an ester structure and represented by the foregoing general formula (IV), compounds having the foregoing structures of C1, C9, C10, C12 to C14, C18 to C20, C30 to C35, and C39 to C42 are preferred; and 2-isocyanatoethyl acrylate (Compound C12), 2-isocyanatoethyl methacrylate (Compound C13), 2-isocyanatoethyl crotonate (Compound C14), 2-(2-isocyanatoethoxy)ethyl acrylate (Compound C40), 2-(2-isocyanatoethoxyl)ethyl methacrylate (Compound C41), or 2-(2-isocyanatoethoxyl)ethyl crotonate (Compound C42) is more preferred.

In the nonaqueous electrolytic solution of the present invention, a content of the isocyanate compound having an ester structure and represented by the general formula (IV) is preferably from 0.001 to 5% by mass in the nonaqueous electrolytic solution. When the content is 5% by mass or less, there is less concern that a surface film is excessively formed on the electrode, thereby causing worsening of a high-temperature cycle property, and when it is 0.001% by mass or more, a surface film is sufficiently formed, thereby increasing an effect for improving a high-temperature cycle property. The content is preferably 0.01% by mass or more, and more preferably 0.1% by mass or more in the nonaqueous electrolytic solution, and an upper limit thereof is preferably 4% by mass or less, and more preferably 2% by mass or less.

The triple bond-containing compound which is contained in the nonaqueous electrolytic solution of the present invention is represented by the following general formula (V).

$$Z-O-CH_2-C\equiv C-W \qquad (V)$$

(In the formula, Z represents $R^{10}-O-C(=O)-$, $R^{11}-O-C(=O)-C(=O)-$, or $R^{12}-S(=O)_2-$; W represents a hydrogen atom or $-CH_2-O-S(=O)_2-R^{13}$; each of $R^{10}$ to $R^{13}$ independently represents an alkyl group having from 1 to 6 carbon atoms, an alkenyl group having from 2 to 6 carbon atoms, an alkynyl group having from 2 to 6 carbon atoms, or an aryl group having from 6 to 12 carbon atoms, in each of which at least one hydrogen atom may be substituted with a halogen atom, provided that when Z is $R^{10}-O-C(=O)-$ or $R^{11}-O-C(=O)-C(=O)-$, then W is a hydrogen atom.)

Suitable examples of $R^{10}$ to $R^{13}$ in the foregoing general formula (V) include linear alkyl groups, such as a methyl group, an ethyl group, an n-propyl group, an n-butyl group, an n-pentyl group, an n-hexyl group, etc.; branched alkyl groups, such as an isopropyl group, a sec-butyl group, a tert-butyl group, a tert-amyl group, etc.; alkenyl groups, such as a 2-propenyl group, a 2-butenyl group, a 3-butenyl group, a 4-pentenyl group, a 5-hexenyl group, a 2-methyl-2-propenyl group, a 3-methyl-2-butenyl group, etc.; alkynyl groups, such as a 2-propynyl group, a 2-butynyl group, a 3-butynyl group, a 4-pentynyl group, a 5-hexynyl group, a 1-methyl-2-propynyl group, a 1,1-dimethyl-2-propynyl group, etc.; and aryl groups, such as a phenyl group, a 2-methylphenyl group, a 3-methylphenyl group, a 4-methylphenyl group, a 4-tert-butylphenyl group, a 2,4,6-trimethylphenyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 2,4,6-trifluorophenyl group, a pentafluorophenyl group, a 4-trifluoromethylphenyl group, etc.

Of those, a methyl group, an ethyl group, an n-propyl group, an isopropyl group, a 2-propenyl group, a 2-butenyl group, a 2-propynyl group, a 2-butynyl group, a 1-methyl-2-propynyl group, or a phenyl group is preferred, with a methyl group, an ethyl group, a 2-propenyl group, a 2-propynyl group, or a 1-methyl-2-propynyl group being more preferred.

Suitable examples of the triple bond-containing compound represented by the foregoing general formula (V) include the following compounds and the like.

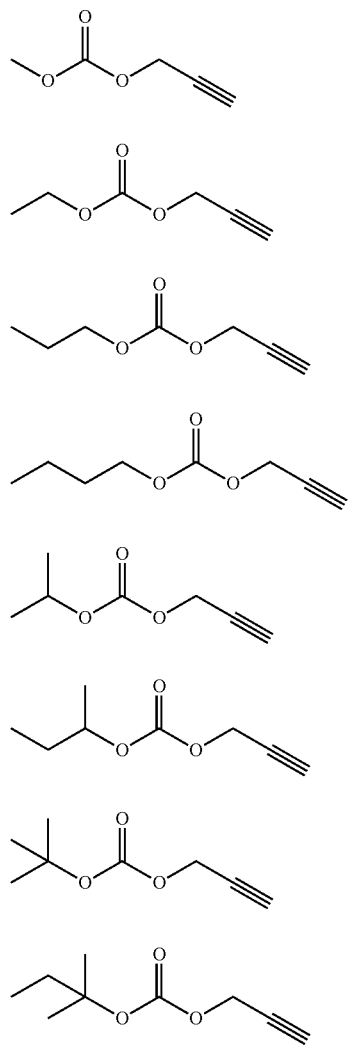

D1 — D8

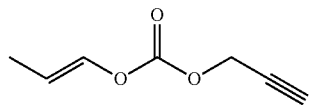 D9

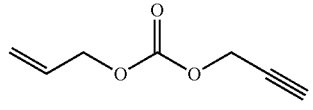 D10

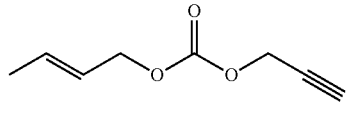 D11

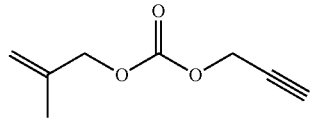 D12

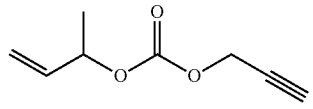 D13

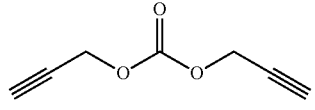 D14

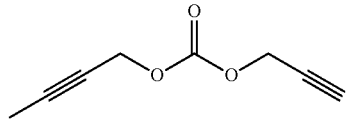 D15

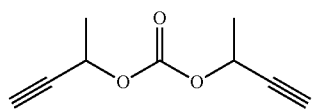 D16

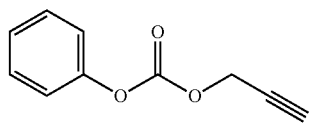 D17

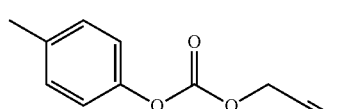 D18

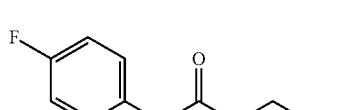 D19

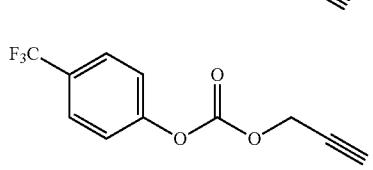 D20

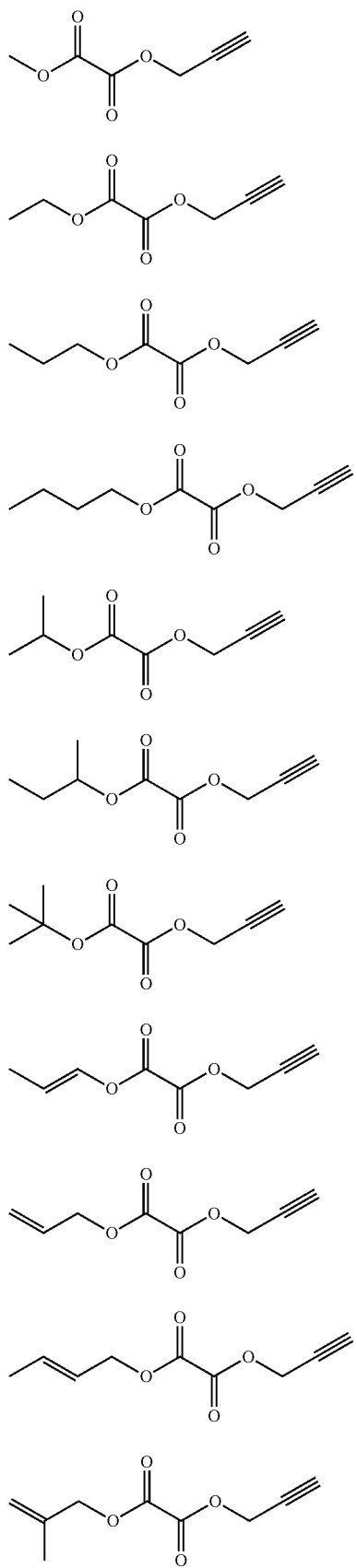
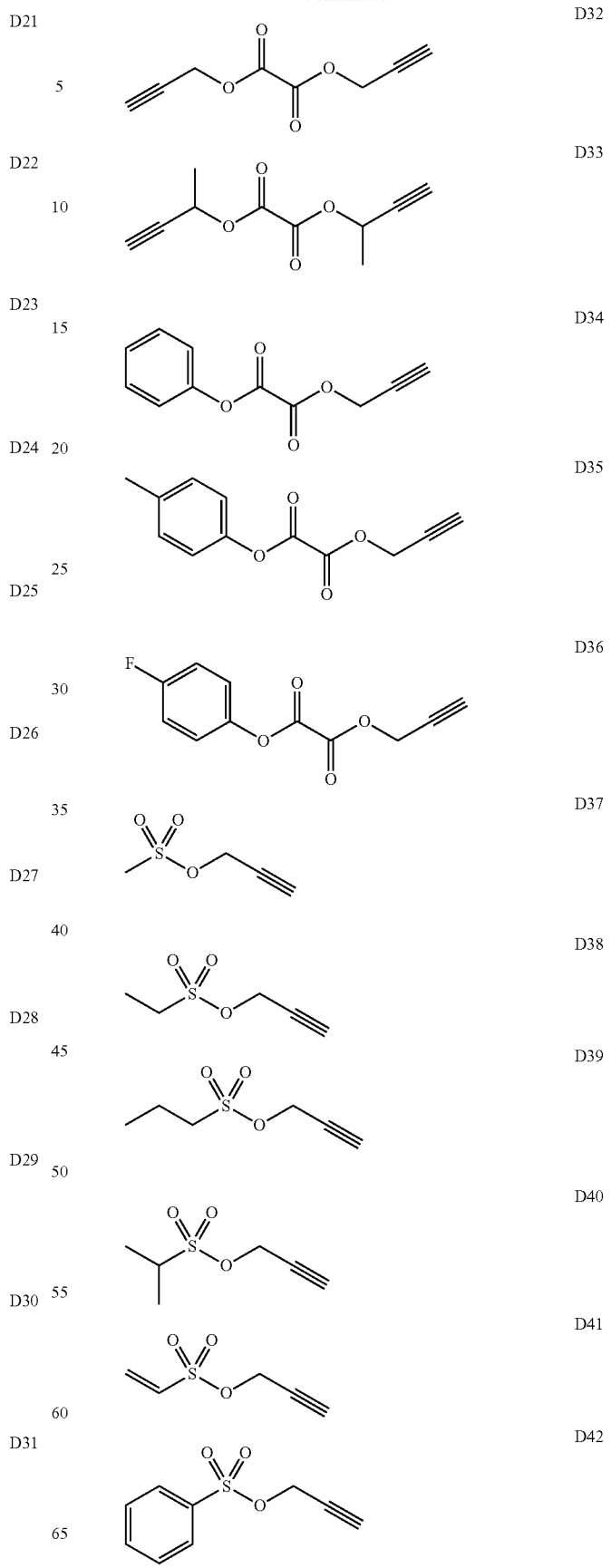

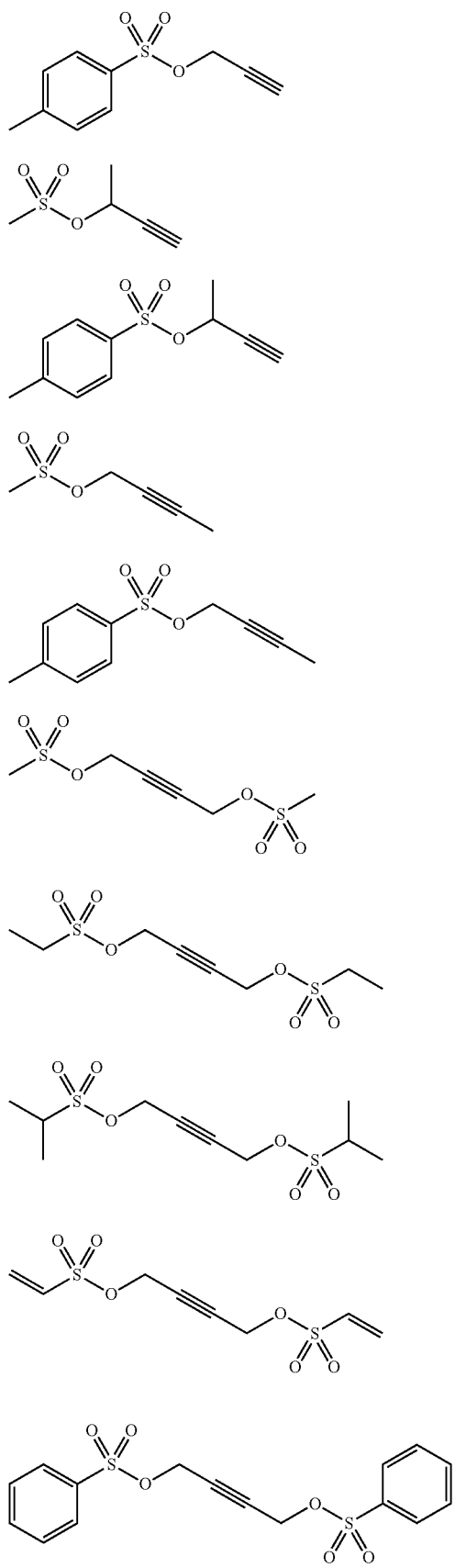
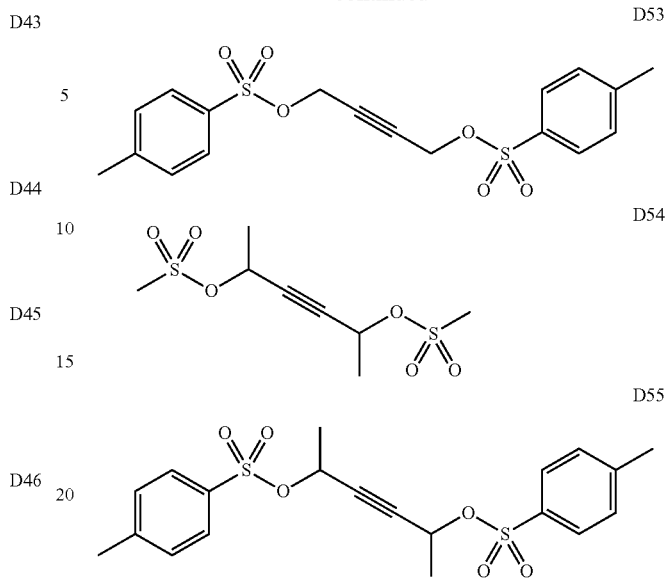

Of the triple bond-containing compounds represented by the foregoing general formula (V), compounds having the foregoing structures of D1 to D3, D5, D10, D14, D17, D21 to D23, D25, D29, D32 to D34, D37 to D39, D41 to D43, D48, D49, and D51 to D53 are preferred; and methyl 2-propynyl carbonate (Compound D1), ethyl 2-propynyl carbonate (Compound D2), methyl 2-propynyl oxalate (Compound D21), ethyl 2-propynyl oxalate (Compound D22), bis(2-propynyl) oxalate (Compound D32), 2-propynyl methanesulfonate (Compound D37), 2-propynyl ethanesulfonate (Compound D38), 2-propynyl vinylsulfonate (Compound D41), 2-butyne-1,4-diyl dimethanesulfonate (Compound D48), or 2-butyne-1,4-diyl diethanesulfonate (Compound D49) is more preferred.

In the nonaqueous electrolytic solution of the present invention, a content of the triple bond-containing compound represented by the general formula (V) is preferably from 0.001 to 5% by mass in the nonaqueous electrolytic solution. When the content is 5% by mass or less, there is less concern that a surface film is excessively formed on the electrode, thereby causing worsening of a high-temperature cycle property, and when it is 0.001% by mass or more, a surface film is sufficiently formed, thereby increasing an effect for improving a high-temperature cycle property. The content is preferably 0.01% by mass or more, and more preferably 0.1% by mass or more in the nonaqueous electrolytic solution, and an upper limit thereof is preferably 4% by mass or less, and more preferably 2% by mass or less.

In addition, in the case of using the diisocyanate compound represented by the general formula (I) and the triple bond-containing compound represented by the general formula (V) in combination, as for a ratio of the content of the diisocyanate compound represented by the general formula (I) to the content of the triple bond-containing compound represented by the general formula (V) in the nonaqueous electrolytic solution, the case where the ratio of the content of the diisocyanate compound represented by the general formula (I) to the content of the triple bond-containing compound represented by the general formula (V) is from 51/49 to 99/1 is preferred because an effect for improving a high-temperature cycle property is increased, and the case where the ratio is from 55/45 to 90/10 is more preferred.

Furthermore, the case where the diisocyanate compound represented by the general formula (I) is used in combination with at least one selected from the phosphoric acid ester compound represented by the general formula (II), the cyclic sulfonic acid ester compound represented by the general formula (III), and the isocyanate compound having an ester structure and represented by the general formula (IV), and at least one of the triple bond-containing compound represented by the general formula (V) is more preferred because an effect for improving a high-temperature cycle property is increased.

In the nonaqueous electrolytic solution of the present invention, by combining the diisocyanate compound represented by the general formula (I) and at least one selected from the phosphoric acid ester compound represented by the general formula (II), the cyclic sulfonic acid ester compound represented by the general formula (III), the isocyanate compound having an ester structure and represented by the general formula (IV), and the triple bond-containing compound represented by the general formula (V) with a nonaqueous solvent and an electrolyte salt as described below, a peculiar effect such that not only the capacity retention rate after a high-temperature cycle may be improved, but also the rate of increase of an electrode thickness may be decreased is revealed.

[Nonaqueous Solvent]

Suitable examples of the nonaqueous solvent which is used for the nonaqueous electrolytic solution of the present invention include cyclic carbonates, linear esters, lactones, ethers, and amides; and it is preferred that both a cyclic carbonate and a linear ester are contained.

The term, linear ester, is used as a concept including a linear carbonate and a linear carboxylic acid ester.

As the cyclic carbonate, one or more selected from ethylene carbonate (EC), propylene carbonate (PC), 1,2-butylene carbonate, 2,3-butylene carbonate, 4-fluoro-1,3-dioxolan-2-one (FEC), trans- or cis-4,5-difluoro-1,3-dioxolan-2-one (the both will be hereunder named generically as "DFEC"), vinylene carbonate (VC), vinyl ethylene carbonate (VEC), and 4-ethynyl-1,3-dioxolan-2-one (EEC) are exemplified; and one or more selected from ethylene carbonate, propylene carbonate, 4-fluoro-1,3-dioxolan-2-one, vinylene carbonate, and 4-ethynyl-1,3-dioxolan-2-one (EEC) are more suitable.

Use of at least one of the aforementioned cyclic carbonates having an unsaturated bond, such as a carbon-carbon double bond, a carbon-carbon triple bond, etc., or a fluorine atom is preferred because a low-temperature load characteristic after high-temperature charging storage is much more improved; and it is more preferred to contain both a cyclic carbonate containing an unsaturated bond, such as a carbon-carbon double bond, a carbon-carbon triple bond, etc., and a cyclic carbonate having a fluorine atom. As the cyclic carbonate having an unsaturated bond, such as a carbon-carbon double bond, a carbon-carbon triple bond, etc., VC, VEC, or EEC is more preferred; and as the cyclic carbonate having a fluorine atom, FEC or DFEC is more preferred.

A content of the cyclic carbonate having an unsaturated bond, such as a carbon-carbon double bond, a carbon-carbon triple bond, etc., is preferably 0.07% by volume or more, more preferably 0.2% by volume or more, and still more preferably 0.7% by volume or more relative to a total volume of the nonaqueous solvent; and when an upper limit thereof is preferably 7% by volume or less, more preferably 4% by volume or less, and still more preferably 2.5% by volume or less, stability of a surface film at the time of high-temperature storage may be much more increased without impairing Li ion permeability at low temperatures, and hence, such is preferred.

A content of the cyclic carbonate having a fluorine atom is preferably 0.07% by volume or more, more preferably 4% by volume or more, and still more preferably 7% by volume or more relative to a total volume of the nonaqueous solvent; and when an upper limit thereof is preferably 35% by volume or less, more preferably 25% by volume or less, and still more preferably 15% by volume or less, stability of a surface film at the time of high-temperature storage may be much more increased without impairing Li ion permeability at low temperatures, and hence, such is preferred.

In the case where the nonaqueous solvent contains both a cyclic carbonate having an unsaturated bond, such as a carbon-carbon double bond, a carbon-carbon triple bond, etc., and a cyclic carbonate having a fluorine atom, a content of the cyclic carbonate having an unsaturated bond, such as a carbon-carbon double bond, a carbon-carbon triple bond, etc., is preferably 0.2% by volume or more, more preferably 3% by volume or more, and still more preferably 7% by volume or more relative to a content of the cyclic carbonate having a fluorine atom; and when an upper limit thereof is preferably 40% by volume or less, more preferably 30% by volume or less, and still more preferably 15% by volume or less, stability of a surface film at the time of high-temperature storage may be much more increased without impairing Li ion permeability at low temperatures, and hence, such is especially preferred.

When the nonaqueous solvent contains ethylene carbonate, propylene carbonate, or both ethylene carbonate and propylene carbonate, resistance of a surface film formed on an electrode becomes small, and hence, such is preferred. A content of ethylene carbonate, propylene carbonate, or both ethylene carbonate and propylene carbonate is preferably 3% by volume or more, more preferably 5% by volume or more, and still more preferably 7% by volume or more relative to a total volume of the nonaqueous solvent; and an upper limit thereof is preferably 45% by volume or less, more preferably 35% by volume or less, and still more preferably 25% by volume or less.

These solvents may be used solely; and in the case where a combination of two or more of the solvents is used, the electrochemical characteristics are more improved in a broad temperature range, and hence, such is preferred, and use of a combination of three or more thereof is especially preferred. As suitable combinations of these cyclic carbonates, EC and PC; EC and VC; PC and VC; VC and FEC; EC and FEC; PC and FEC; FEC and DFEC; EC and DFEC; PC and DFEC; VC and DFEC; VEC and DFEC; VC and EEC; EC and EEC; EC, PC and VC; EC, PC and FEC; EC, VC and FEC; EC, VC and VEC; EC, VC and EEC; EC, EEC and FEC; PC, VC and FEC; EC, VC and DFEC; PC, VC and DFEC; EC, PC, VC and FEC; EC, PC, VC and DFEC; etc. are preferred. Among the aforementioned combinations, combinations, such as EC and VC; EC and FEC; PC and FEC; EC, PC and VC; EC, PC and FEC; EC, VC and FEC; EC, VC and EEC; EC, EEC and FEC; PC, VC and FEC; EC, PC, VC and FEC; etc., are more preferred.

As the linear ester, there are suitably exemplified asymmetric linear carbonates, such as methyl ethyl carbonate (MEC), methyl propyl carbonate (MPC), methyl isopropyl carbonate (MIPC), methyl butyl carbonate, ethyl propyl carbonate, etc.; symmetric linear carbonates, such as, dimethyl carbonate (DMC), diethyl carbonate (DEC), dipropyl carbonate, dibutyl carbonate, etc.; and linear carboxylic acid esters, such as pivalic acid esters, such as methyl pivalate, ethyl pivalate, propyl pivalate, etc., methyl propionate, ethyl propionate, methyl acetate, ethyl acetate, etc.

Among the aforementioned linear esters, linear esters having a methyl group, which are selected from dimethyl carbonate, methyl ethyl carbonate, methyl propyl carbonate, methyl isopropyl carbonate, methyl butyl carbonate, methyl propionate, methyl acetate, and ethyl acetate are preferred, and linear carbonates having a methyl group are especially preferred. This is because decomposition in the negative electrode hardly proceeds, so that deterioration of the capacity may be suppressed.

Although a content of the linear ester is not particularly limited, it is preferred to use the linear ester in an amount in the range of from 60 to 90% by volume relative to a total volume of the nonaqueous solvent. When the content is 60% by volume or more, an effect for decreasing the viscosity of the nonaqueous electrolytic solution is thoroughly obtained, whereas when it is 90% by volume or less, an electroconductivity of the nonaqueous electrolytic solution thoroughly increases, whereby the electrochemical characteristics in a broad temperature range are improved, and therefore, it is preferred that the content of the linear ester falls within the aforementioned range.

In the case of using a linear carbonate, it is preferred to use two or more kinds thereof. Furthermore, it is more preferred that both a symmetric linear carbonate and an asymmetric linear carbonate are contained, and it is still more preferred that a content of the symmetric linear carbonate is more than that of the asymmetric linear carbonate.

A proportion of the volume of the symmetric linear carbonate occupying in the linear carbonate is preferably 51% by volume or more, and more preferably 55% by volume or more. An upper limit thereof is more preferably 95% by volume or less, and still more preferably 85% by volume or less. It is especially preferred that dimethyl carbonate is contained as the symmetric linear carbonate. It is more preferred that the asymmetric linear carbonate has a methyl group, and methyl ethyl carbonate is especially preferred.

The aforementioned case is preferred because the high-temperature cycle property is much more improved.

As for a proportion of the cyclic carbonate and the linear carbonate, from the viewpoint of improving the electrochemical characteristics in a broad temperature range, a ratio of the cyclic carbonate to the linear carbonate (volume ratio) is preferably from 10/90 to 45/55, more preferably from 15/85 to 40/60, and especially preferably from 20/80 to 35/65.

For the purpose of improving electrochemical characteristics in a broader temperature range, it is preferred to further add other additives in the nonaqueous electrolytic solution.

Specifically, suitable examples of other additives include phosphoric acid esters, such as trimethyl phosphate, tributyl phosphate, trioctyl phosphate, etc.; nitriles, such as acetonitrile, propionitrile, succinonitrile, glutaronitrile, adiponitrile, pimelonitrile, etc.; S=O bond-containing compounds selected from sultone compounds, such as 1,3-propanesultone, 1,3-butanesultone, 2,4-butanesultone, 1,4-butanesultone, etc., cyclic sulfite compounds, such as ethylene sulfite, hexahydrobenzo[1,3,2]dioxathiolane-2-oxide (also called 1,2-cyclohexanediol cyclic sulfite), 5-vinyl-hexahydro-1,3,2-benzodioxathiol-2-oxide, etc., sulfonic acid ester compounds, such as butane-2,3-diyl dimethanesulfonate, butane-1,4-diyl dimethanesulfonate, methylene methanedisulfonate, dimethyl methanedisulfonate, etc., vinylsulfone compounds, such as divinylsulfone, 1,2-bis(vinylsulfonyl)ethane, bis(2-vinylsulfonylethyl) ether, etc., and the like; linear carboxylic anhydrides, such as acetic anhydride, propionic anhydride, etc.; cyclic acid anhydrides, such as succinic anhydride, maleic anhydride, glutaric anhydride, itaconic anhydride, 3-sulfo-propionic anhydride, etc.; cyclic phosphazene compounds, such as methoxypentafluorocyclotriphosphazene, ethoxypentafluorocyclotriphosphazene, phenoxypentafluorocyclotriphosphazene, ethoxyheptafluorocyclotetraphosphazene, etc.; aromatic compounds having a branched alkyl group, such as cyclohexylbenzene, fluorocyclohexylbenzene compounds (e.g., 1-fluoro-2-cyclohexylbenzene, 1-fluoro-3-cyclohexylbenzene, 1-fluoro-4-cyclohexylbenzene), tert-butylbenzene, tert-amylbenzene, 1-fluoro-4-tert-butylbenzene, etc.; and aromatic compounds, such as biphenyl, terphenyl (o-, m-, p-form), diphenyl ether, fluorobenzene, difluorobenzene (o-, m-, p-form), anisole, 2,4-difluoroanisole, partial hydrides of terphenyl (e.g., 1,2-dicyclohexylbenzene, 2-phenylbicyclohexyl, 1,2-diphenylcyclohexane, or o-cyclohexylbiphenyl), etc.

[Electrolyte Salt]

As the electrolyte salt which is used in the present invention, there are suitably exemplified the following lithium salts.

(Lithium Salt)

As the electrolyte salt which is used in the present invention, there are suitably exemplified the following lithium salts.

As the lithium salt, there are suitably exemplified inorganic lithium salts, such as $LiPF_6$, $LiPO_2F_2$, $Li_2PO_3F$, $LiBF_4$, $LiClO_4$, $LiSO_3F$, etc.; linear fluoroalkyl group-containing lithium salts, such as $LiN(SO_2F)_2$, $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, etc.; cyclic fluoroalkylene chain-containing lithium salts, such as $(CF_2)_2(SO_2)_2NLi$, $(CF_2)_3(SO_2)_2NLi$, etc.; and lithium salts having an oxalate complex as an anion, such as lithium bis[oxalate-O,O']borate (LiBOB), lithium difluoro[oxalate-O,O']borate, lithium difluorobis[oxalate-O,O']phosphate, lithium tetrafluoro[oxalate-O,O']phosphate, etc.; and these may be used solely or in admixture of two or more kinds thereof.

Of those, one or more selected from $LiPF_6$, $LiPO_2F_2$, $Li_2PO_3F$, $LiBF_4$, $LiSO_3F$, $LiN(SO_2CF_3)_2$, $LiN(SO_2C_2F_5)_2$, $LiN(SO_2F)_2$, lithium bis[oxalate-O,O']borate (LiBOB), lithium difluorobis[oxalate-O,O']phosphate, and lithium tetrafluoro[oxalate-O,O']phosphate are preferred; one or more selected from $LiPF_6$, $LiBF_4$, $LiN(SO_2CF_3)_2$, $LiN(SO_2F)_2$, lithium bis[oxalate-O,O']borate (LiBOB), and lithium difluorobis[oxalate-O,O']phosphate are more preferred; and it is most preferred to use $LiPF_6$. In general, a concentration of the lithium salt is preferably 0.3 M or more, more preferably 0.7 M or more, and still more preferably 1.1 M or more relative to the aforementioned nonaqueous solvent. An upper limit thereof is preferably 2.5 M or less, more preferably 2.0 M or less, and still more preferably 1.6 M or less.

[Production of Nonaqueous Electrolytic Solution]

The nonaqueous electrolytic solution of the present invention may be, for example, obtained by mixing the aforementioned nonaqueous solvent and adding the diisocyanate compound represented by the general formula (I), and at least one selected from the phosphoric acid ester compound represented by the general formula (II), the cyclic sulfonic acid ester compound represented by the general formula (III), the isocyanate compound having an ester structure and represented by the general formula (IV), and the triple bond-containing compound represented by the general formula (V) to the aforementioned electrolyte salt and the nonaqueous electrolytic solution.

At this time, the nonaqueous solvent used and the compounds added to the nonaqueous electrolytic solution are preferably purified previously to reduce as much as possible the content of impurities, in such an extent that does not extremely deteriorate the productivity.

The nonaqueous electrolytic solution of the present invention may be used in first and second energy storage devices shown below, in which the nonaqueous electrolyte may be used not only in the form of a liquid but also in the form of gel. Furthermore, the nonaqueous electrolytic solution of the present invention may also be used for a solid polymer electrolyte. Among these, the nonaqueous electrolytic solution is preferably used in the first energy storage device using a lithium salt as the electrolyte salt (i.e., for a lithium battery) or in the second energy storage device (i.e., for a lithium ion capacitor), more preferably used in a lithium battery, and most suitably used in a lithium secondary battery.

[First Energy Storage Device (Lithium Battery)]

The lithium battery of the present invention is a generic name for a lithium primary battery and a lithium secondary battery. In the present specification, the term, lithium secondary battery, is used as a concept that includes a so-called lithium ion secondary battery. The lithium battery of the present invention contains a positive electrode, a negative electrode, and the aforementioned nonaqueous electrolytic solution having an electrolyte salt dissolved in a nonaqueous solvent. Other constitutional members used than the nonaqueous electrolytic solution, such as the positive electrode, the negative electrode, etc., are not particularly limited.

For example, as the positive electrode active material for lithium secondary batteries, usable is a complex metal oxide of lithium and one or more selected from cobalt, manganese, and nickel. These positive electrode active materials may be used solely or in combination of two or more kinds thereof.

As the lithium complex metal oxides, for example, one or more selected from $LiCoO_2$, $LiMn_2O_4$, $LiNiO_2$, $LiCo_{1-x}Ni_xO_2$ ($0.01<x<1$), $LiCo_{1/3}Ni_{1/3}Mn_{1/3}O_2$, $LiNi_{1/2}Mn_{3/2}O_4$, and $LiCo_{0.98}Mg_{0.02}O_2$ are preferably exemplified. These materials may be used as a combination, such as a combination of $LiCoO_2$ and $LiMn_2O_4$, a combination of $LiCoO_2$ and $LiNiO_2$, and a combination of $LiMn_2O_4$ and $LiNiO_2$.

For improving the safety on overcharging and the cycle property, and for enabling the use at a charge potential of 4.3 V or more, a part of the lithium complex metal oxide may be substituted with other elements. For example, a part of cobalt, manganese, or nickel may be substituted with at least one or more elements of Sn, Mg, Fe, Ti, Al, Zr, Cr, V, Ga, Zn, Cu, Bi, Mo, La, etc.; or a part of O may be substituted with S or F; or the oxide may be coated with a compound containing any of such other elements.

Of the aforementioned positive electrode active materials, preferred are lithium complex metal oxides, such as $LiCoO_2$, $LiMn_2O_4$, and $LiNiO_2$, with which the charge potential of the positive electrode in a fully-charged state may be used at 4.3 V or more based on Li; and more preferred are lithium complex metal oxides, such as solid solutions of $LiCo_{1-x}M_xO_2$ (wherein M is at least one element selected from Sn, Mg, Fe, Ti, Al, Zr, Cr, V, Ga, Zn, and Cu; $0.001 \le x \le 0.05$), $LiCo_{1/3}Ni_{1/3}Mn_{1/3}O_2$, $LiNi_{1/2}Mn_{3/2}O_4$, $Li_2MnO_3$, and $LiMO_2$ (wherein M is a transition metal, such as Co, Ni, Mn, Fe, etc.) that may be used at 4.4 V or more. The use of the lithium complex metal oxide capable of acting at a high charge voltage may worsen the electrochemical characteristics particularly on using in a broad temperature range due to the reaction with the electrolytic solution on charging, but in the lithium secondary battery of the present invention, the electrochemical characteristics may be prevented from worsening.

Furthermore, a lithium-containing olivine-type phosphate may also be used as the positive electrode active material. Especially preferred are lithium-containing olivine-type phosphates containing one or more selected from iron, cobalt, nickel, and manganese. Specific examples thereof include $LiFePO_4$, $LiCoPO_4$, $LiNiPO_4$, and $LiMnPO_4$.

These lithium-containing olivine-type phosphates may be partly substituted with any other element; and for example, a part of iron, cobalt, nickel, or manganese therein may be substituted with one or more elements selected from Co, Mn, Ni, Mg, Al, B, Ti, V, Nb, Cu, Zn, Mo, Ca, Sr, W, and Zr; or the phosphates may be coated with a compound containing any of these other elements or with a carbon material. Among those, $LiFePO_4$ or $LiMnPO_4$ is preferred. The lithium-containing olivine-type phosphate may be used, for example, in combination with the aforementioned positive electrode active material.

For the positive electrode for lithium primary batteries, there are suitably exemplified oxides or chalcogen compounds of one or more metal elements, such as $CuO$, $Cu_2O$, $Ag_2O$, $Ag_2CrO_4$, $CuS$, $CuSO_4$, $TiO_2$, $TiS_2$, $SiO_2$, $SnO$, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, $FeO$, $Fe_3O_4$, $Ni_2O_3$, $NiO$, $CoO_3$, $CoO$, etc.; sulfur compounds, such as $SO_2$, $SOCl_2$, etc.; and carbon fluorides (graphite fluoride) represented by a general formula $(CF_x)_n$. Above all, $MnO_2$, $V_2O_5$, or graphite fluoride is preferred.

An electroconductive agent of the positive electrode is not particularly limited so long as it is an electron-conductive material that does not undergo a chemical change. Examples thereof include graphites, such as natural graphite (e.g., flaky graphite, etc.), artificial graphite, etc.; and carbon blacks, such as acetylene black, Ketjen black, channel black, furnace black, lamp black, and thermal black, etc. Graphite and carbon black may be properly mixed and used.

An addition amount of the electroconductive agent to the positive electrode mixture is preferably from 1 to 10% by mass, and especially preferably from 2 to 5% by mass.

The positive electrode may be produced by mixing the aforementioned positive electrode active material with an electroconductive agent, such as acetylene black, carbon black, etc., and a binder, such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), an ethylene-propylene-diene terpolymer, etc., adding a high-boiling point solvent, such as 1-methyl-2-pyrrolidone, etc., thereto, followed by kneading to prepare a positive electrode mixture, applying this positive electrode mixture onto a collector, such as an aluminum foil, a stainless steel-made lath plate, etc., and drying and shaping the resultant under pressure, followed by a heat treatment in vacuum at a temperature of from about 50° C. to 250° C. for about 2 hours.

A density of a portion of the positive electrode except for the collector is generally 1.5 $g/cm^3$ or more, and for the purpose of further increasing the capacity of the battery, the density is preferably 2 $g/cm^3$ or more, more preferably 3 $g/cm^3$ or more, and still more preferably 3.6 $g/cm^3$ or more. An upper limit thereof is preferably 4 $g/cm^3$ or less.

As the negative electrode active material for lithium secondary batteries, one or more selected from a lithium metal, lithium alloys, or carbon materials capable of absorbing and releasing lithium [e.g., graphitizable carbon, non-graphitizable carbon having a spacing of the (002) plane of 0.37 nm or more, graphite having a spacing of the (002) plane of 0.34 nm or less, etc.], tin (elemental substance), tin compounds, silicon (elemental substance), silicon compounds, and lithium titanate compounds, such as $Li_4Ti_5O_{12}$, etc., may be used in combination. Of those, in absorbing and releasing ability of a lithium ion, it is more preferred to use a high-crystalline carbon material, such as artificial graphite, natural graphite, etc.; and it is especially preferred to use a carbon material having a graphite-type crystal structure in which a lattice (002) spacing ($d_{002}$) is 0.340 nm (nanometers) or less, especially from 0.335 to 0.337 nm.

By using an artificial graphite particle having a bulky structure in which plural flat graphite fine particles are mutually gathered or bound in non-parallel, or a graphite particle prepared by subjecting a flaky natural graphite particle to a spheroidizing treatment by repeatedly giving a mechanical action, such as compression force, frictional force, shear force, etc. as the aforementioned negative electrode active material, when a ratio [I(110)/I(004)] of a peak intensity I(110) of the (110) plane to a peak intensity I(004) of the (004) plane of the graphite crystal, which is obtained from the X-ray diffraction measurement of a negative electrode sheet at the time of shaping under pressure of a portion of the negative electrode except for the collector in a density of 1.5 g/cm$^3$ or more, is 0.01 or more, the electrochemical characteristics in a much broader temperature range are improved, and hence, such is preferable; and the peak intensity ratio [I(110)/I(004)] is more preferably 0.05 or more, and still more preferably 0.1 or more. When excessively treated, there may be the case where the crystallinity is worsened, and the discharge capacity of the battery is worsened, and therefore, an upper limit of the peak intensity ratio [I(110)/I(004)] is preferably 0.5 or less, and more preferably 0.3 or less.

When the high-crystalline carbon material (core material) is coated with a carbon material that is more low-crystalline than the core material, the electrochemical characteristics in a broad temperature range become much more favorable, and hence, such is preferable. The crystallinity of the carbon material of the coating may be confirmed by TEM. When the high-crystalline carbon material is used, there is a tendency that it reacts with the nonaqueous electrolytic solution on charging, thereby worsening the electrochemical characteristics at low temperatures or high temperatures due to an increase of the interfacial resistance; however, in the lithium secondary battery according to the present invention, the electrochemical characteristics in a broad temperature range become favorable.

As the metal compound capable of absorbing and releasing lithium, serving as a negative electrode active material, there are preferably exemplified compounds containing at least one metal element, such as Si, Ge, Sn, Pb, P, Sb, Bi, Al, Ga, In, Ti, Mn, Fe, Co, Ni, Cu, Zn, Ag, Mg, Sr, Ba, etc. The metal compound may be in any form including an elemental substance, an alloy, an oxide, a nitride, a sulfide, a boride, and an alloy with lithium, and any of an elemental substance, an alloy, an oxide, and an alloy with lithium is preferred since the battery capacity may be increased thereby. Above all, more preferred are those containing at least one element selected from Si, Ge, and Sn, and especially preferred are those containing at least one element selected from Si and Sn, as capable of increasing the battery capacity.

The negative electrode may be formed in such a manner that the same electroconductive agent, binder, and high-boiling point solvent as in the formation of the aforementioned positive electrode are used and kneaded to provide a negative electrode mixture, and the negative electrode mixture is then applied onto a collector, such as a copper foil, dried, shaped under pressure, and then heat-treated in vacuum at a temperature of approximately from 50 to 250° C. for approximately 2 hours.

A density of the part except for the collector of the negative electrode is generally 1.1 g/cm$^3$ or more, and for further increasing the battery capacity, the density is preferably 1.5 g/cm$^3$ or more, and especially preferably 1.7 g/cm$^3$ or more. An upper limit thereof is preferably 2 g/cm$^3$ or less.

Examples of the negative electrode active material for a lithium primary battery include a lithium metal and a lithium alloy.

The structure of the lithium battery is not particularly limited, and may be a coin-type battery, a cylinder-type battery, a prismatic battery, a laminate-type battery, or the like, each having a single-layered or multi-layered separator.

Although the separator for the battery is not particularly limited, a single-layered or laminated micro-porous film of a polyolefin, such as polypropylene, polyethylene, etc., as well as a woven fabric, a nonwoven fabric, etc. may be used.

The lithium secondary battery of the present invention has excellent electrochemical characteristics in a broad temperature range even when the final charging voltage is 4.2 V or more, and particularly 4.3 V or more, and furthermore, the characteristics thereof are still good even at 4.4 V or more. Although the final discharging voltage may be generally 2.8 V or more, and further 2.5 V or more, the final discharging voltage of the lithium secondary battery of the present invention may be 2.0 V or more. Although a current value is not specifically limited, in general, the battery is used within the range of from 0.1 to 30C. The lithium battery of the present invention may be charged/discharged at from −40 to 100° C., and preferably at from −10 to 80° C.

In the present invention, as a countermeasure against an increase in the internal pressure of the lithium battery, such a method may be employed that a safety valve is provided in the battery cap, and a cutout is provided in the battery component, such as a battery can, a gasket, etc. As a safety countermeasure for preventing overcharging, a current cut-off mechanism capable of detecting an internal pressure of the battery to cut off the current may be provided in a battery cap.

[Second Energy Storage Device (Lithium Ion Capacitor)]

The second energy storage device of the present invention is an energy storage device that contains the nonaqueous electrolytic solution of the present invention and stores energy by utilizing intercalation of a lithium ion into a carbon material, such as graphite, etc., as the negative electrode. This energy storage device may also be referred to as a lithium ion capacitor (LIC). Preferred examples of the positive electrode include one utilizing an electric double layer between an active carbon electrode and an electrolytic solution therein, and one utilizing doping/dedoping reaction of a n-conjugated polymer electrode. The electrolytic solution contains at least a lithium salt, such as LiPF$_6$, etc.

EXAMPLES

Examples 1 to 67 and Comparative Examples 1 to 6

Production of Lithium Ion Secondary Battery

94% by mass of LiCoO$_2$ and 3% by mass of acetylene black (electroconductive agent) were mixed and then added to and mixed with a solution which had been prepared by dissolving 3% by mass of polyvinylidene fluoride (binder) in 1-methyl-2-pyrrolidone in advance, thereby preparing a positive electrode mixture paste. This positive electrode mixture paste was applied onto one surface of an aluminum foil (collector), dried, and treated under pressure, followed by punching out in a prescribed size, thereby producing a positive electrode sheet. A density of a portion of the positive electrode except for the collector was 3.6 g/cm$^3$.

95% by mass of artificial graphite ($d_{002}$=0.335 nm, negative electrode active material) was added to and mixed with a solution which had been prepared by dissolving 5% by mass of polyvinylidene fluoride (binder) in 1-methyl-2-pyrrolidone in advance, thereby preparing a negative electrode mixture paste. This negative electrode mixture paste was applied onto one surface of a copper foil (collector), dried, and treated under pressure, followed by punching out in a prescribed size, thereby producing a negative electrode sheet. A density of a portion of the negative electrode except for the collector was 1.5 g/cm$^3$. This electrode sheet was analyzed by means of X-ray diffraction, and as a result, a ratio [I(110)/I(004)] of a peak intensity I(110) of the (110) plane to a peak intensity I(004) of the (004) plane of the graphite crystal was found to be 0.1.

The above-obtained positive electrode sheet, a micro-porous polyethylene film-made separator, and the above-obtained negative electrode sheet were laminated in this order, and a nonaqueous electrolytic solution having a composition shown in each of Tables 1 to 6 was added thereto, thereby producing a laminate-type battery.

[Evaluation of High-Temperature Cycle Property]

In a thermostatic chamber at 60° C., the battery produced by the above-described method was treated by repeating a cycle of charging up to a final voltage of 4.3 V with a constant current of 1 C and under a constant voltage for 3 hours and subsequently discharging down to a discharge voltage of 3.0 V with a constant current of 1 C, until it reached 100 cycles. Then, a discharge capacity retention rate after 100 cycles at 60° C. was determined according to the following equation.

Discharge capacity retention rate (%)=(Discharge capacity after 100th cycle)/(Discharge capacity after 1st cycle)×100

<Evaluation of Gas Generation Amount after 100 Cycles>

A gas generation amount after 100 cycles was measured by the Archimedean method. As for the gas generation amount, a relative gas generation amount was examined on the basis of defining the gas generation amount of Comparative Example 1 as 100%.

<Initial Negative Electrode Thickness>

The battery prepared by the aforementioned method was subjected to one cycle under the same condition as in "Evaluation of High-Temperature Cycle Property" described above, and then was disassembled, and an initial negative electrode thickness was measured.

<Negative Electrode Thickness after Cycles>

The battery prepared by the aforementioned method was subjected to 100 cycles under the same condition as in "Evaluation of High-Temperature Cycle Property" described above, and then was disassembled, and a negative electrode thickness after high-temperature cycles was measured.

<Increase Rate in Negative Electrode Thickness>

An increase rate in negative electrode thickness was determined according to the following equation.

Increase rate in negative electrode thickness (%)= [{(Negative electrode thickness after 100 cycles at 60° C.)−(Initial negative electrode thickness)}/ (Initial negative electrode thickness)]×100

TABLE 1

| | Composition of electrolyte salt Composition of nonaqueous electrolytic solution (Volume ratio of solvent) | Compound of general formula (I) | | Compound of general formula (II) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 1 | 1.1M LiPF6 EC/DMC/MEC (30/65/5) | OCN-(CH2)6-NCO | 1 | (structure) | 1 | 74 | 6 |
| Example 2 | 1.1M LiPF6 EC/FEC/ DMC/MEC (29/1/65/5) | | 1 | | 1 | 76 | 4 |
| Example 3 | 1.1M LiPF6 EC/FEC/PC/ DMC/MEC (10/15/5/65/5) | | 1 | | 1 | 78 | 3 |
| Example 4 | 1.1M LiPF6 EC/FEC/PC/ DMC/MEC (10/15/5/65/5) | | 1 | | 0.05 | 70 | 6 |
| Example 5 | 1.1M LiPF6 EC/FEC/PC/ DMC/MEC (10/15/5/65/5) | | 1 | | 3 | 76 | 5 |
| Example 6 | 1.1M LiPF6 EC/FEC/PC/ DMC/MEC (10/15/5/65/5) | | 0.05 | | 1 | 73 | 6 |
| Example 7 | 1.1M LiPF6 EC/FEC/PC/ DMC/MEC (10/15/5/65/5) | | 3 | | 1 | 75 | 5 |
| Example 8 | 1.1M LiPF6 EC/FEC/VC/ DMC/MEC (25/4/1/65/5) | | 1 | | 1 | 79 | 3 |

TABLE 1-continued

| | Composition of electrolyte salt Composition of nonaqueous electrolytic solution (Volume ratio of solvent) | Compound of general formula (I) | | Compound of general formula (II) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 9 | 1.1M LiPF6 EC/FEC/EEC/ DMC/MEC (24/5/1/65/5) | | 1 | | 1 | 80 | 4 |
| Example 10 | 1.1M LiPF6 EC/FEC/VC/PC/ DMC/MEC/DEC (25/3/1/1/55/10/5) | | 1 | | 1 | 81 | 2 |
| Example 11 | 1.1M LiPF6 EC/FEC/PC/ DMC/MEC (10/15/5/65/5) | | 1 |  | 1 | 78 | 4 |
| Example 12 | 1.1M LiPF6 EC/FEC/PC/ DMC/MEC (10/15/5/65/5) | | 1 | 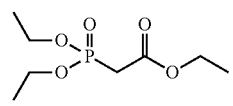 | 1 | 79 | 4 |
| Example 13 | 1.1M LiPF6 EC/FEC/PC/ DMC/MEC (10/15/5/65/5) | 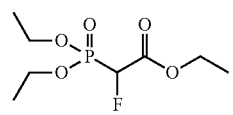 | 1 |  | 1 | 75 | 6 |
| Example 14 | 1.1M LiPF6 EC/FEC/PC/ DMC/MEC (10/15/5/65/5) | 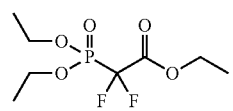 [SMILES: CCOC(=O)C(F)(F)P(=O)(OCC)OCC] | 1 | | 1 | 74 | 7 |
| Example 15 | 1.1M LiPF6 EC/FEC/PC/ DMC/MEC (10/15/5/65/5) | 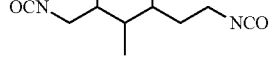 | 1 | | 1 | 74 | 6 |
| Comparative Example 1 | 1.1M LiPF6 EC/DMC/MEC (30/65/5) | None | 0 | None | 0 | 63 | 13 |
| Comparative Example 2 | 1.1M LiPF6 EC/DMC/MEC (30/65/5) |  | 1 | None | 0 | 67 | 11 |
| Comparative Example 5 | 1.1M LiPF6 EC/DMC/MEC (30/65/5) | None | 0 | 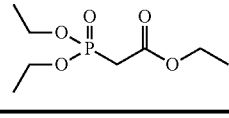 | 1 | 65 | 11 |

TABLE 2

| | Composition of electrolyte salt Composition of nonaqueous electrolytic solution (Volume ratio of solvent) | Compound of general formula (I) | | Compound of general formula (II) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 16 | 1.1M LiPF6 EC/FEC/PC/DMC/MEC (10/15/5/65/5) | 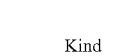 | 1 | 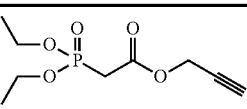 | 1 | 80 | 3 |

TABLE 2-continued

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formula (II) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 17 | 1.1M LiPF6 EC/FEC/PC/DMC/MEC (10/15/5/65/5) | | 1 | | 0.05 | 71 | 5 |
| Example 18 | 1.1M LiPF6 EC/FEC/PC/DMC/MEC (10/15/5/65/5) | | 1 | | 3 | 77 | 5 |
| Example 19 | 1.1M LiPF6 EC/FEC/PC/DMC/MEC (10/15/5/65/5) | | 0.05 | | 1 | 75 | 4 |
| Example 20 | 1.1M LiPF6 EC/FEC/PC/DMC/MEC (10/15/5/65/5) | | 3 | | 1 | 77 | 5 |
| Example 21 | 1.1M LiPF6 EC/FEC/PC/DMC/MEC (10/15/5/65/5) | | 1 | (EtO)$_2$P(=O)CH(CH$_3$)C(=O)OCH$_2$C≡CH | 1 | 77 | 4 |
| Example 22 | 1.1M LiPF6 EC/FEC/PC/DMC/MEC (10/15/5/65/5) | | 1 | (EtO)$_2$P(=O)CHFC(=O)OCH$_2$C≡CH | 1 | 76 | 5 |
| Example 23 | 1.1M LiPF6 EC/FEC/PC/DMC/MEC (10/15/5/65/5) | | 1 | (EtO)$_2$P(=O)CF$_2$C(=O)OCH$_2$C≡CH | 1 | 75 | 6 |

TABLE 3

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formula (III) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 24 | 1.1M LiPF6 EC/DMC/MEC (30/65/5) | OCN-(CH$_2$)$_6$-NCO | 1 | 3,3-dimethyl-dihydro-1,2-oxathiole-4(3H)-one 2,2-dioxide | 1 | 75 | 5 |
| Example 25 | 1.1M LiPF6 EC/FEC/PC/DMC/MEC (10/15/5/65/5) | | 1 | | 1 | 78 | 3 |
| Example 26 | 1.1M LiPF6 EC/FEC/PC/DMC/MEC (10/15/5/65/5) | | 1 | | 0.05 | 71 | 5 |
| Example 27 | 1.1M LiPF6 EC/FEC/PC/DMC/MEC (10/15/5/65/5) | | 1 | | 3 | 75 | 4 |
| Example 28 | 1.1M LiPF6 EC/FEC/PC/DMC/MEC (10/15/5/65/5) | | 0.05 | | 1 | 73 | 5 |
| Example 29 | 1.1M LiPF6 EC/FEC/PC/DMC/MEC (10/15/5/65/5) | | 3 | | 1 | 76 | 4 |

TABLE 3-continued

| | Composition of electrolyte salt Composition of nonaqueous electrolytic solution (Volume ratio of solvent) | Compound of general formula (I) | | Compound of general formula (III) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 30 | 1.1M LiPF6 EC/FEC/PC/DMC/MEC (10/15/5/65/5) | | 1 | 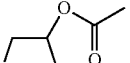 | 1 | 79 | 3 |
| Example 31 | 1.1M LiPF6 EC/FEC/PC/DMC/MEC (10/15/5/65/5) | | 1 | | 0.05 | 71 | 6 |
| Example 32 | 1.1M LiPF6 EC/FEC/PC/DMC/MEC (10/15/5/65/5) | | 1 | | 3 | 76 | 4 |
| Example 33 | 1.1M LiPF6 EC/FEC/PC/DMC/MEC (10/15/5/65/5) | | 0.05 | | 1 | 73 | 6 |
| Example 34 | 1.1M LiPF6 EC/FEC/PC/DMC/MEC (10/15/5/65/5) | | 3 | | 1 | 77 | 5 |
| Example 35 | 1.1M LiPF6 EC/FEC/PC/DMC/MEC (10/15/5/65/5) | 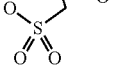 | 1 |  | 1 | 74 | 4 |
| Example 36 | 1.1M LiPF6 EC/FEC/PC/DMC/MEC (10/15/5/65/5) | 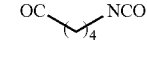 | 1 | | 1 | 73 | 5 |
| Example 37 | 1.1M LiPF6 EC/FEC/PC/DMC/MEC (10/15/5/65/5) |  | 1 | | 1 | 72 | 6 |
| Comparative Example 1 | 1.1M LiPF6 EC/DMC/MEC (30/65/5) | None | 0 | None | 0 | 63 | 13 |
| Comparative Example 2 | 1.1M LiPF6 EC/DMC/MEC (30/65/5) | 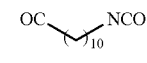 | 1 | None | 0 | 67 | 11 |
| Comparative Example 4 | 1.1M LiPF6 EC/DMC/MEC (30/65/5) | None | 0 | 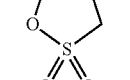 | 1 | 66 | 10 |

TABLE 4

| | Composition of electrolyte salt Composition of nonaqueous electrolytic solution (Volume ratio of solvent) | Compound of general formula (I) | | Compound of general formula (IV) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 38 | 1.1M LiPF6 EC/DMC/MEC (30/65/5) | 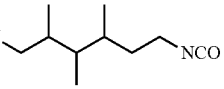 | 1 | 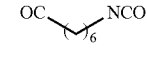 | 1 | 75 | 5 |
| Example 39 | 1.1M LiPF6 EC/FEC/DMC/MEC (29/1/65/5) | | 1 | | 1 | 77 | 4 |

TABLE 4-continued

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formula (IV) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 40 | 1.1M LiPF6 EC/FEC/PC/ DMC/MEC (10/15/5/65/5) | | 1 | | 1 | 79 | 3 |
| Example 41 | 1.1M LiPF6 EC/FEC/PC/ DMC/MEC (10/15/5/65/5) | | 1 | | 0.05 | 71 | 5 |
| Example 42 | 1.1M LiPF6 EC/FEC/PC/ DMC/MEC (10/15/5/65/5) | | 1 | | 3 | 76 | 4 |
| Example 43 | 1.1M LiPF6 EC/FEC/PC/ DMC/MEC (10/15/5/65/5) | | 0.05 | | 1 | 74 | 5 |
| Example 44 | 1.1M LiPF6 EC/FEC/PC/ DMC/MEC (10/15/5/65/5) | | 3 | | 1 | 76 | 4 |
| Example 45 | 1.1M LiPF6 EC/FEC/VC/ DMC/MEC (25/4/1/65/5) | | 1 | | 1 | 80 | 3 |
| Example 46 | 1.1M LiPF6 EC/FEC/EEC/ DMC/MEC (24/5/1/65/5) | | 1 | | 1 | 81 | 3 |
| Example 47 | 1.1M LiPF6 EC/FEC/VC/ PC/DMC/ MEC/DEC (25/3/1/1/55/10/5) | | 1 | | 1 | 82 | 2 |
| Example 48 | 1.1M LiPF6 EC/FEC/PC/ DMC/MEC (10/15/5/65/5) | | 1 | benzoyloxyethyl isocyanate structure | 1 | 76 | 4 |
| Example 49 | 1.1M LiPF6 EC/FEC/PC/ DMC/MEC (10/15/5/65/5) | | 1 | methacryloyloxyethoxyethyl isocyanate structure | 1 | 78 | 4 |
| Example 50 | 1.1M LiPF6 EC/FEC/PC/ DMC/MEC (10/15/5/65/5) | OCN-(CH2)4-NCO | 1 | methacryloyloxyethyl isocyanate structure | 1 | 76 | 5 |
| Example 51 | 1.1M LiPF6 EC/FEC/PC/ DMC/MEC (10/15/5/65/5) | OCN-(CH2)10-NCO | 1 | | 1 | 75 | 5 |
| Example 52 | 1.1M LiPF6 EC/FEC/PC/ DMC/MEC (10/15/5/65/5) | OCN-CH(CH3)CH(CH3)CH(CH3)CH2CH2-NCO | 1 | | 1 | 75 | 5 |
| Comparative Example 1 | 1.1M LiPF6 EC/DMC/MEC (30/65/5) | None | 0 | None | 0 | 63 | 13 |

US 9,318,776 B2

TABLE 4-continued

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formula (IV) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Comparative Example 2 | 1.1M LiPF6 EC/DMC/MEC (30/65/5) | OCN-(CH2)6-NCO | 1 | None | 0 | 67 | 11 |
| Comparative Example 5 | 1.1M LiPF6 EC/DMC/MEC (30/65/5) | None | 0 | 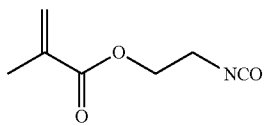 | 1 | 66 | 12 |

TABLE 5

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formulae (V) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 53 | 1.1M LiPF6 EC/DMC/MEC (30/65/5) | OCN-(CH2)6-NCO | 1 | 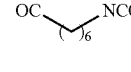 | 1 | 75 | 5 |
| Example 54 | 1.1M LiPF6 EC/FEC/PC/ DMC/MEC (10/15/5/65/5) | | 1 | | 0.05 | 77 | 4 |
| Example 55 | 1.1M LiPF6 EC/FEC/PC/ DMC/MEC (10/15/5/65/5) | | 1 | | 0.8 | 79 | 3 |
| Example 56 | 1.1M LiPF6 EC/FEC/PC/ DMC/MEC (10/15/5/65/5) | | 3 | | 1 | 78 | 3 |
| Example 57 | 1.1M LiPF6 EC/FEC/PC/ DMC/MEC (10/15/5/65/5) | | 0.05 | | 1 | 73 | 5 |
| Example 58 | 1.1M LiPF6 EC/FEC/PC/ DMC/MEC (10/15/5/65/5) | | 1 | | 3 | 74 | 5 |
| Example 59 | 1.1M LiPF6 EC/FEC/PC/ DMC/MEC (10/15/5/65/5) | | 1 | 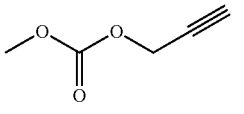 | 0.8 | 76 | 4 |
| Example 60 | 1.1M LiPF6 EC/FEC/PC/ DMC/MEC (10/15/5/65/5) | | 1 | 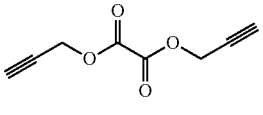 | 0.8 | 80 | 4 |
| Example 61 | 1.1M LiPF6 EC/FEC/PC/ DMC/MEC (10/15/5/65/5) | | 1 | 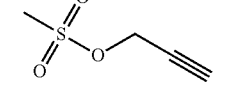 | 0.8 | 79 | 4 |

TABLE 5-continued

|  | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formulae (V) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 62 | 1.1M LiPF6 EC/FEC/PC/ DMC/MEC (10/15/5/65/5) | OC–(–)4–NCO | 1 | 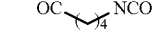 | 0.8 | 77 | 5 |
| Example 63 | 1.1M LiPF6 EC/FEC/PC/ DMC/MEC (10/15/5/65/5) | OC–(–)10–NCO | 1 | | 0.8 | 76 | 6 |
| Example 64 | 1.1M LiPF6 EC/FEC/PC/ DMC/MEC (10/15/5/65/5) | 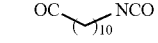 | 1 | | 0.8 | 76 | 6 |
| Comparative Example 1 | 1.1M LiPF6 EC/DMC/MEC (30/65/5) | None | 0 | None | 0 | 63 | 13 |
| Comparative Example 2 | 1.1M LiPF6 EC/DMC/MEC (30/65/5) | OC–(–)6–NCO | 1 | None | 0 | 67 | 11 |
| Comparative Example 6 | 1.1M LiPF6 EC/DMC/MEC (30/65/5) | None | 0 | 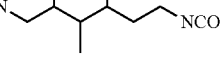 | 1 | 68 | 12 |

TABLE 6

|  | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formulae (II) to (V) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 65 | 1.1M LiPF6 EC/DMC/MEC (30/65/5) | OC–(–)6–NCO | 1 | 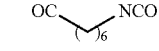 + 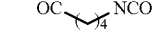 | 1 + 1 | 80 | 3 |
| Example 66 | 1.1M LiPF6 EC/DMC/MEC (30/65/5) | OC–(–)6–NCO | 1 | 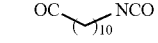 + | 1 + 1 | 81 | 3 |

TABLE 6-continued

| Composition of electrolyte salt Composition of nonaqueous electrolytic solution (Volume ratio of solvent) | Compound of general formula (I) | | Compound of general formulae (II) to (V) | | Discharge capacity retention rate after 100 cycles at 60° C. (%) | Increase rate in negative electrode thickness after 100 cycles at 60° C. (%) |
|---|---|---|---|---|---|---|
| | Kind | Addition amount (content in nonaqueous electrolytic solution) (% by mass) | Kind | Addition amount (content in nonaqueous electrolytic solution) (% by mass) | | |
| Example 67 | 1.1M LiPF6 EC/DMC/MEC (30/65/5) | OCN-(CH2)6-NCO | 1 | [structures: bis-methanesulfonate of 2-butyne-1,4-diol; and 2-isocyanatoethyl methacrylate; and bis-methanesulfonate of 2-butyne-1,4-diol] | 1 + 1 | 78 | 3 |

Examples 68 to 71 and Comparative Examples 7 to 11

Negative electrode sheets were produced by using silicon (elemental substance) (negative electrode active material) in place of the negative electrode active materials used in Examples 1, 24, 38 and 53 and Comparative Examples 2 to 6, respectively. 40% by mass of silicon (elemental substance), 50% by mass of artificial graphite ($d_{002}$=0.335 nm, negative electrode active material), and 5% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Laminate-type batteries were produced in the same manner as in Examples 1, 24, 38 and 53 and Comparative Examples 2 to 6, respectively, except that this negative electrode mixture paste was applied onto one surface of a copper foil (collector), dried, and treated under pressure, followed by punching out in a prescribed size, thereby producing a negative electrode sheet, and the batteries were evaluated. The results are shown in Tables 7 to 10.

TABLE 7

| Composition of electrolyte salt Composition of nonaqueous electrolytic solution (Volume ratio of solvent) | Compound of general formula (I) | | Compound of general formula (II) | | Discharge capacity retention rate after 100 cycles at 60° C. (%) | Increase rate in negative electrode thickness after 100 cycles at 60° C. (%) |
|---|---|---|---|---|---|---|
| | Kind | Addition amount (content in nonaqueous electrolytic solution) (% by mass) | Kind | Addition amount (content in nonaqueous electrolytic solution) (% by mass) | | |
| Example 68 | 1.1M LiPF6 EC/DMC/MEC (30/65/5) | OCN-(CH2)6-NCO | 1 | [diethyl (ethoxycarbonylmethyl)phosphonate structure] | 1 | 66 | 20 |
| Comparative Example 7 | 1.1M LiPF6 EC/DMC/MEC (30/65/5) | | 1 | None | 0 | 55 | 82 |
| Comparative Example 8 | 1.1M LiPF6 EC/DMC/MEC (30/65/5) | None | 0 | [diethyl (ethoxycarbonylmethyl)phosphonate structure] | 1 | 66 | 72 |

TABLE 8

| Composition of electrolyte salt Composition of nonaqueous electrolytic solution (Volume ratio of solvent) | Compound of general formula (I) | | Compound of general formula (III) | | Discharge capacity retention rate after 100 cycles at 60° C. (%) | Increase rate in negative electrode thickness after 100 cycles at 60° C. (%) |
|---|---|---|---|---|---|---|
| | Kind | Addition amount (content in nonaqueous electrolytic solution) (% by mass) | Kind | Addition amount (content in nonaqueous electrolytic solution) (% by mass) | | |
| Example 69 | 1.1M LiPF6 EC/DMC/MEC (30/65/5) | OCN-(CH2)6-NCO | 1 | [structure: 4,4-dimethyl sultone ketone] | 1 | 66 | 19 |
| Comparative Example 7 | 1.1M LiPF6 EC/DMC/MEC (30/65/5) | | 1 | None | 0 | 55 | 82 |
| Comparative Example 9 | 1.1M LiPF6 EC/DMC/MEC (30/65/5) | None | 0 | [structure: 4,4-dimethyl sultone ketone] | 1 | 66 | 73 |

TABLE 9

| Composition of electrolyte salt Composition of nonaqueous electrolytic solution (Volume ratio of solvent) | Compound of general formula (I) | | Compound of general formula (IV) | | Discharge capacity retention rate after 100 cycles at 60° C. (%) | Increase rate in negative electrode thickness after 100 cycles at 60° C. (%) |
|---|---|---|---|---|---|---|
| | Kind | Addition amount (content in nonaqueous electrolytic solution) (% by mass) | Kind | Addition amount (content in nonaqueous electrolytic solution) (% by mass) | | |
| Example 70 | 1.1M LiPF6 EC/DMC/MEC (30/65/5) | OCN-(CH2)6-NCO | 1 | [structure: 2-isocyanatoethyl methacrylate] | 1 | 67 | 20 |
| Comparative Example 7 | 1.1M LiPF6 EC/DMC/MEC (30/65/5) | | 1 | None | 0 | 55 | 82 |
| Comparative Example 10 | 1.1M LiPF6 EC/DMC/MEC (30/65/5) | None | 0 | [structure: 2-isocyanatoethyl methacrylate] | 1 | 66 | 74 |

TABLE 10

| | Composition of electrolyte salt Composition of nonaqueous electrolytic solution (Volume ratio of solvent) | Compound of general formula (I) | | Compound of general formula (V) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 71 | 1.1M LiPF6 EC/DMC/MEC (30/65/5) | OC–(–)6–NCO | 1 | [methanesulfonate-butynediyl-methanesulfonate structure] | 1 | 67 | 18 |
| Comparative Example 7 | 1.1M LiPF6 EC/DMC/MEC (30/65/5) | | 1 | None | 0 | 55 | 82 |
| Comparative Example 11 | 1.1M LiPF6 EC/DMC/MEC (30/65/5) | None | 0 | [methanesulfonate-butynediyl-methanesulfonate structure] | 1 | 66 | 73 |

Examples 72 to 75 and Comparative Examples 12 to 16

Positive electrode sheets were produced by using LiFePO₄ (positive electrode active material) coated with amorphous carbon in place of the positive electrode active materials used in Examples 1, 24, 38 and 53 and Comparative Examples 2 to 6, respectively. 90% by mass of LiFePO₄ coated with amorphous carbon and 5% by mass of acetylene black (electro-conductive agent) were mixed and then added to and mixed with a solution which had been prepared by dissolving 5% by mass of polyvinylidene fluoride (binder) in 1-methyl-2-pyrrolidone in advance, thereby preparing a positive electrode mixture paste. Laminate-type batteries were produced in the same manner as in Examples 1, 24, 38 and 53 and Comparative Examples 2 to 6, respectively, except that this positive electrode mixture paste was applied onto one surface of an aluminum foil (collector), dried, and treated under pressure, followed by punching out in a prescribed size, thereby producing a positive electrode sheet; and that in evaluating the battery, the final charging voltage and the final discharging voltage were set to 3.6 V and 2.0 V, respectively, and the batteries were evaluated. The results are shown in Tables 11 to 14.

TABLE 11

| | Composition of electrolyte salt Composition of nonaqueous electrolytic solution (Volume ratio of solvent) | Compound of general formula (I) | | Compound of general formula (II) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 72 | 1.1M LiPF6 EC/DMC/MEC (30/65/5) | OC–(–)6–NCO | 1 | [diethoxyphosphoryl acetate structure] | 1 | 87 | 4 |
| Comparative Example 12 | 1.1M LiPF6 EC/DMC/MEC (30/65/5) | | 1 | None | 0 | 75 | 9 |
| Comparative Example 13 | 1.1M LiPF6 EC/DMC/MEC (30/65/5) | None | 0 | [diethoxyphosphoryl acetate structure] | 1 | 79 | 8 |

TABLE 12

| | Composition of electrolyte salt Composition of nonaqueous electrolytic solution (Volume ratio of solvent) | Compound of general formula (I) | | Compound of general formula (III) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 73 | 1.1M LiPF6 EC/DMC/MEC (30/65/5) | OC~(CH₂)₆~NCO | 1 | (structure) | 1 | 88 | 4 |
| Comparative Example 12 | 1.1M LiPF6 EC/DMC/MEC (30/65/5) | | 1 | None | 0 | 75 | 9 |
| Comparative Example 14 | 1.1M LiPF6 EC/DMC/MEC (30/65/5) | None | 0 | (structure) | 1 | 80 | 7 |

TABLE 13

| | Composition of electrolyte salt Composition of nonaqueous electrolytic solution (Volume ratio of solvent) | Compound of general formula (I) | | Compound of general formula (IV) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 74 | 1.1M LiPF6 EC/DMC/MEC (30/65/5) | OC~(CH₂)₆~NCO | 1 | (structure) | 1 | 88 | 5 |
| Comparative Example 12 | 1.1M LiPF6 EC/DMC/MEC (30/65/5) | | 1 | None | 0 | 75 | 9 |
| Comparative Example 15 | 1.1M LiPF6 EC/DMC/MEC (30/65/5) | None | 0 | (structure) | 1 | 80 | 7 |

TABLE 14

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formula (V) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 75 | 1.1M LiPF6 EC/DMC/MEC (30/65/5) | OCN-(CH2)6-NCO | 1 |  | 0.8 | 89 | 4 |
| Comparative Example 12 | 1.1M LiPF6 EC/DMC/MEC (30/65/5) | | 1 | None | 0 | 75 | 9 |
| Comparative Example 16 | 1.1M LiPF6 EC/DMC/MEC (30/65/5) | None | 0 | 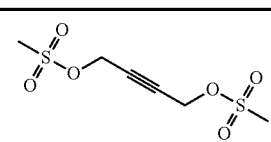 | 1 | 82 | 10 |

Examples 76 to 79 and Comparative Examples 17 to 21

Negative electrode sheets were produced by using lithium titanate Li$_4$Ti$_5$O$_{12}$ (negative electrode active material) in place of the negative electrode active materials used in Examples 1, 24, 38 and 53 and Comparative Examples 2 to 6, respectively. 80% by mass of lithium titanate Li$_4$Ti$_5$O$_{12}$ and 15% by mass of acetylene black (electroconductive agent) were mixed and then added to and mixed with a solution which had been prepared by dissolving 5% by mass of polyvinylidene fluoride (binder) in 1-methyl-2-pyrrolidone in advance, thereby preparing a negative electrode mixture paste. Laminate-type batteries were produced in the same manner as in Examples 1, 24, 38 and 53 and Comparative Examples 2 to 6, respectively, except that this negative electrode mixture paste was applied onto a copper foil (collector), dried, and treated under pressure, followed by punching out in a prescribed size, thereby producing a negative electrode sheet; that in evaluating the battery, the final charging voltage and the final discharging voltage were set to 2.8 V and 1.2 V, respectively; and that the composition of the nonaqueous electrolytic solution and the kind and amount of the additive were changed to those as prescribed, and the batteries were evaluated. The results are shown in Tables 15 to 18.

TABLE 15

| | Composition of electrolyte salt Composition of nonaqueous electrolytic solution (Volume ratio of solvent) | Compound of general formula (I) Kind | Addition amount (content in nonaqueous electrolytic solution) (% by mass) | Compound of general formula (II) Kind | Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 76 | 1.1M LiPF6 EC/DMC/MEC (30/65/5) | OCN-(CH2)6-NCO | 1 | 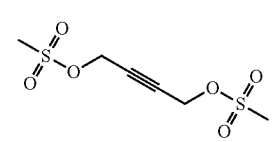 | 1 | 92 | 2 |
| Comparative Example 17 | 1.1M LiPF6 EC/DMC/MEC (30/65/5) | | 1 | None | 0 | 82 | 4 |
| Comparative Example 18 | 1.1M LiPF6 EC/DMC/MEC (30/65/5) | None | 0 |  | 1 | 85 | 5 |

TABLE 16

| | Composition of electrolyte salt Composition of nonaqueous electrolytic solution (Volume ratio of solvent) | Compound of general formula (I) | | Compound of general formula (III) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 77 | 1.1M LiPF6 EC/DMC/MEC (30/65/5) | OCN(CH₂)₆NCO | 1 | 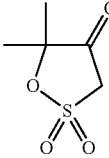 | 1 | 93 | 2 |
| Comparative Example 17 | 1.1M LiPF6 EC/DMC/MEC (30/65/5) | | 1 | None | 0 | 82 | 4 |
| Comparative Example 19 | 1.1M LiPF6 EC/DMC/MEC (30/65/5) | None | 0 | 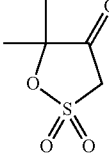 | 1 | 87 | 4 |

TABLE 17

| | Composition of electrolyte salt Composition of nonaqueous electrolytic solution (Volume ratio of solvent) | Compound of general formula (I) | | Compound of general formula (IV) | | Discharge capacity retention rate after 100 cycles at 60° C. (%) | Increase rate in negative electrode thickness after 100 cycles at 60° C. (%) |
|---|---|---|---|---|---|---|---|
| | | Kind | Addition amount (content in nonaqueous electrolytic solution) (% by mass) | Kind | Addition amount (content in nonaqueous electrolytic solution) (% by mass) | | |
| Example 78 | 1.1M LiPF6 EC/DMC/MEC (30/65/5) | OCN(CH₂)₆NCO | 1 | 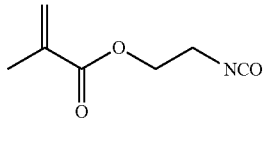 | 1 | 93 | 1 |
| Comparative Example 17 | 1.1M LiPF6 EC/DMC/MEC (30/65/5) | | 1 | None | 0 | 82 | 4 |
| Comparative Example 20 | 1.1M LiPF6 EC/DMC/MEC (30/65/5) | None | 0 | 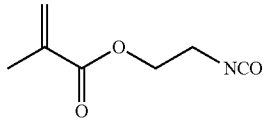 | 1 | 84 | 3 |

TABLE 18

| | Composition of electrolyte salt Composition of nonaqueous electrolytic solution (Volume ratio of solvent) | Compound of general formula (I) Kind | Compound of general formula (I) Addition amount (content in nonaqueous electrolytic solution) (% by mass) | Compound of general formula (III) Kind | Compound of general formula (III) Addition amount (content in nonaqueous electrolytic solution) (% by mass) | Discharge capacity retention rate after 100 cycles at 60° C. (%) | Increase rate in negative electrode thickness after 100 cycles at 60° C. (%) |
|---|---|---|---|---|---|---|---|
| Example 79 | 1.1M LiPF6 EC/DMC/MEC (30/65/5) | OCN-(CH2)6-NCO | 1 | (cyclic sulfonate with propargyl methanesulfonate structure) | 0.8 | 94 | 1 |
| Comparative Example 17 | 1.1M LiPF6 EC/DMC/MEC (30/65/5) | | 1 | None | 0 | 82 | 4 |
| Comparative Example 21 | 1.1M LiPF6 EC/DMC/MEC (30/65/5) | None | 0 | (cyclic sulfonate with propargyl methanesulfonate structure) | 1 | 85 | 3 |

In all of the lithium secondary batteries of the aforesaid Examples 1 to 67, not only the cycle property is improved, but also the increase in negative electrode thickness is suppressed in the nonaqueous electrolytic solution of the invention of the present application, as compared with the lithium secondary batteries of Comparative Example 1 which is the case of not adding any of the diisocyanate compound represented by the general formula (I), the phosphoric acid ester compound represented by the general formula (II), the cyclic sulfonic acid ester compound represented by the general formula (III), the isocyanate compound having an ester structure and represented by the general formula (IV), and the triple bond-containing compound represented by the general formula (V), Comparative Example 2 which is the case of adding only the diisocyanate compound represented by the general formula (I), Comparative Example 3 which is the case of adding only the phosphoric acid ester compound represented by the general formula (II), Comparative Example 4 which is the case of adding only the cyclic sulfonic acid ester compound represented by the general formula (III), Comparative Example 5 which is the case of adding only the isocyanate compound having an ester structure and represented by the general formula (IV), and Comparative Example 6 which is the case of adding only the triple bond-containing compound represented by the general formula (V).

In addition, as a result of measuring the gas generation amount after a high-temperature cycle in the lithium secondary batteries produced under the same conditions as in Examples 1, 24, 38 and 53 and Comparative Example 2, respectively by the Archimedean method, when the gas generation amount of Comparative Example 1 was defined as 100%, the gas generation amount of Example 1, Example 24, Example 38, Example 53, and Comparative Example 2 was 79%, 77%, 79%, 78%, and 80%, respectively, and therefore, the suppression of gas generation was equal.

From the foregoing, it has been clarified that the effect of the present invention for decreasing the rate of increase in an electrode thickness is a peculiar effect to the case of containing the specified compound of the invention of the present application in the nonaqueous electrolytic solution having an electrolyte salt dissolved in a nonaqueous solvent.

In addition, from the comparison between Examples 68 to 71 and Comparative Examples 7 to 11, the comparison between Examples 72 to 75 and Comparative Examples 12 to 16, and the comparison between Examples 76 to 79 and Comparative Examples 17 to 21, the same effect is found in the case of using silicon (elemental substance) or lithium titanate for the negative electrode, or in the case of using a lithium-containing olivine-type iron phosphate (LiFePO$_4$) for the positive electrode. In consequence, it is clear that the advantageous effect of the present invention is not an effect relying on a specified positive electrode or negative electrode.

Furthermore, the nonaqueous electrolytic solutions of Examples 1 to 79 of the present invention also have an effect for improving discharging properties of a lithium primary battery in a broad temperature range.

INDUSTRIAL APPLICABILITY

The energy storage device using the nonaqueous electrolytic solution of the present invention is useful as an energy storage device, such as a lithium secondary battery having excellent electrochemical characteristics in a broad temperature range, etc.

The invention claimed is:
1. A nonaqueous electrolytic solution having an electrolyte salt dissolved in a nonaqueous solvent, the nonaqueous electrolytic solution comprising from 0.001 to 5% by mass of a diisocyanate compound represented by the following general formula (I) and further comprising from 0.001 to 5% by mass of at least one selected from a phosphoric acid ester compound represented by the following general formula (II), a cyclic sulfonic acid ester compound represented by the following general formula (III), an isocyanate compound having an ester structure and represented by the following general formula (IV), and a triple bond-containing compound represented by the following general formula (V):

$$\text{OCN-L-NCO} \tag{I}$$

wherein
L represents an optionally branched alkylene group having from 4 to 12 carbon atoms,

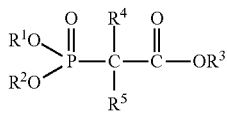

(II)

wherein
each of $R^1$ and $R^2$ independently represents an alkyl group having from 1 to 6 carbon atoms or a halogenated alkyl group having from 1 to 6 carbon atoms, in which at least one hydrogen atom is substituted with a halogen atom; $R^3$ represents an alkyl group having from 1 to 6 carbon atoms, an alkenyl group having from 2 to 6 carbon atoms, or an alkynyl group having from 3 to 6 carbon atoms; and each of $R^4$ and $R^5$ independently represents a hydrogen atom, a halogen atom, or an alkyl group having from 1 to 4 carbon atoms,

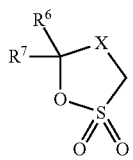

(III)

wherein
each of $R^6$ and $R^7$ independently represents a hydrogen atom, an alkyl group having from 1 to 6 carbon atoms, in which at least one hydrogen atom may be substituted with a halogen atom, or a halogen atom; X represents —CH(OR$^8$)— or —C(=O)—; $R^8$ represents a formyl group, an alkyl carbonyl group having from 2 to 7 carbon atoms, an alkenyl carbonyl group having from 3 to 7 carbon atoms, an alkynyl carbonyl group having from 3 to 7 carbon atoms, or an aryl carbonyl group having from 7 to 13 carbon atoms; and at least one hydrogen atom in $R^8$ may be substituted with a halogen atom, $$R^9-C-O-Y-N=C=O$$
$$\parallel$$
$$O$$

(IV)

wherein
$R^9$ represents an alkyl group having from 1 to 6 carbon atoms, an alkenyl group having from 2 to 6 carbon atoms, an aryl group having from 6 to 12 carbon atoms, an alkyloxy group having from 1 to 6 carbon atoms, an alkenyloxy group having from 2 to 6 carbon atoms, an isocyanatoalkyloxy group having from 2 to 6 carbon atoms, or an aryloxy group having from 6 to 12 carbon atoms, in each of which at least one hydrogen atom may be substituted with a halogen atom; and Y represents a linear or branched alkylene group having from 1 to 6 carbon atoms, in which at least one hydrogen atom may be substituted with a halogen atom, or a divalent linking group having from 2 to 6 carbon atoms and containing at least one ether bond, and

Z—O—CH$_2$—C≡C—W (V)

wherein
Z represents $R^{10}$—O—C(=O)—, $R^{11}$—O—C(=O)—C(=O)—, or $R^{12}$—S(=O)$_2$—; W represents a hydrogen atom or —CH$_2$—O—S(=O)$_2$—$R^{13}$; each of $R^{10}$ to $R^{13}$ independently represents an alkyl group having from 1 to 6 carbon atoms, an alkenyl group having from 2 to 6 carbon atoms, an alkynyl group having from 2 to 6 carbon atoms, or an aryl group having from 6 to 12 carbon atoms, in each of which at least one hydrogen atom may be substituted with a halogen atom, provided that when Z is $R^{10}$—O—C(=O)— or $R^{11}$—O—C(=O)—C(=O)—, then W is a hydrogen atom.

2. The nonaqueous electrolytic solution according to claim 1, wherein the diisocyanate compound represented by the general formula (I) is 1,6-diisocyanatohexane.

3. The nonaqueous electrolytic solution according to claim 1, wherein in the nonaqueous electrolytic solution, the nonaqueous solvent includes a cyclic carbonate and a linear carbonate, and the linear carbonate includes both a symmetric linear carbonate and an asymmetric linear carbonate.

4. The nonaqueous electrolytic solution according to claim 3, wherein in the nonaqueous electrolytic solution, the cyclic carbonate includes at least two or more selected from ethylene carbonate, propylene carbonate, 1,2-butylene carbonate, 2,3-butylene carbonate, 4-fluoro-1,3-dioxolan-2-one, trans- or cis-4,5-difluoro-1,3-dioxolan-2-one, vinylene carbonate, vinyl ethylene carbonate, and 4-ethynyl-1,3-dioxolan-2-one.

5. The nonaqueous electrolytic solution according to claim 3, wherein the asymmetric linear carbonate is one or two or more selected from methyl ethyl carbonate, methyl propyl carbonate, methyl isopropyl carbonate, methyl butyl carbonate, and ethyl propyl carbonate.

6. The nonaqueous electrolytic solution according to claim 3, wherein the symmetric linear carbonate is one or two or more selected from dimethyl carbonate, diethyl carbonate, dipropyl carbonate, and dibutyl carbonate.

7. The nonaqueous electrolytic solution according to claim 1, wherein the electrolyte salt includes one or two or more lithium salts selected from LiPF$_6$, LiBF$_4$, LiPO$_2$F$_2$, Li$_2$PO$_3$F, LiSO$_3$F, LiN(SO$_2$F)$_2$, LiN(SO$_2$CF$_3$)$_2$, LiN(SO$_2$C$_2$F$_5$)$_2$, lithium bis[oxalate-O,O']borate, lithium difluorobis[oxalate-O,O']phosphate, and lithium tetrafluoro[oxalate-O,O']phosphate.

8. The nonaqueous electrolytic solution according to claim 7, wherein a concentration of the lithium salt is from 0.3 to 2.5 M relative to the nonaqueous solvent.

9. An energy storage device comprising a positive electrode, a negative electrode, and a nonaqueous electrolytic solution having an electrolyte salt dissolved in a nonaqueous solvent, wherein the nonaqueous electrolytic solution comprises from 0.001 to 5% by mass of the diisocyanate compound represented by the general formula (I) according to claim 1 and further comprises from 0.001 to 5% by mass of at least one selected from the phosphoric acid ester compound represented by the general formula (II), the cyclic sulfonic acid ester compound represented by the general formula (III), the isocyanate compound having an ester structure and represented by the general formula (IV), and the triple bond-containing compound represented by the general formula (V) according to claim 1.

10. The energy storage device according to claim 9, wherein an active material of the positive electrode is a complex metal oxide of lithium containing one or more selected from cobalt, manganese, and nickel, or a lithium-containing olivine-type phosphate containing one or more selected from iron, cobalt, nickel, and manganese.

11. The energy storage device according to claim 9, wherein an active material of the negative electrode contains one or more selected from a lithium metal, a lithium alloy, a carbon material capable of absorbing and releasing lithium, tin, a tin compound, silicon, a silicon compound, and a lithium titanate compound.

* * * * *